United States Patent
Shimada et al.

(10) Patent No.: US 12,328,385 B2
(45) Date of Patent: Jun. 10, 2025

(54) PROVIDING SECURITY FOR EDGE COMPUTING USING LOCATION DATA

(71) Applicant: INTERNATIONAL BUSINESS MACHINES CORPORATION, Armonk, NY (US)

(72) Inventors: Junichi Shimada, Kamakura (JP); Daisuke Maruyama, Yamato (JP); Ichiro Takiguchi, Kawaski (JP); Yoshinori Tahara, Yamato (JP); Jiayun Zhu, Edogawa-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 330 days.

(21) Appl. No.: 18/183,488

(22) Filed: Mar. 14, 2023

(65) Prior Publication Data
US 2024/0313951 A1    Sep. 19, 2024

(51) Int. Cl.
*H04L 9/08* (2006.01)
*H04L 9/40* (2022.01)
(Continued)

(52) U.S. Cl.
CPC ........ *H04L 9/0822* (2013.01); *H04L 63/0492* (2013.01); *H04W 12/043* (2021.01); *H04W 12/63* (2021.01)

(58) Field of Classification Search
None
See application file for complete search history.

(56) References Cited

U.S. PATENT DOCUMENTS

| 10,439,820 B2 | 10/2019 | Egner et al. |
| 11,233,650 B2 | 1/2022 | Mondello et al. |

(Continued)

FOREIGN PATENT DOCUMENTS

| CN | 115174076 A | 10/2022 |
| JP | 2010016559 A | 1/2010 |
| JP | 2021145635 A | 9/2021 |

OTHER PUBLICATIONS

P. Wuille, "Hierarchical Deterministic Wallets", github.com, Feb. 11, 2012, 1 pp.

(Continued)

*Primary Examiner* — William J. Goodchild
(74) *Attorney, Agent, or Firm* — KONRAD, RAYNES, DAVDA & VICTOR LLP; Janaki K. Davda

(57) ABSTRACT

Provided are techniques for providing security for edge computing using location data. A command base location of an entity, an application identifier of the entity, and an expire date for the application identifier are determined. A message generated from the command base location and the application identifier is sent to a location authority. A signed command base location is received based on the command base location being within a jurisdiction of the location authority and a current date being before the expire date. A common key for the command base location is generated using the application identifier and the signed command base location. A public key is generated using the common key. A message is encrypted using the public key to create a cryptographic message. The cryptographic message is sent.

20 Claims, 23 Drawing Sheets

(51) Int. Cl.
  *H04W 12/043* (2021.01)
  *H04W 12/63* (2021.01)

(56) References Cited

U.S. PATENT DOCUMENTS

| | | | | |
|---|---|---|---|---|
| 2004/0185842 A1* | 9/2004 | Spaur | ................. | B60R 25/33 |
| | | | | 455/410 |
| 2018/0367314 A1* | 12/2018 | Egner | ................ | H04L 63/107 |
| 2020/0382328 A1* | 12/2020 | Bhattacharya | .......... | G06F 21/78 |
| 2022/0094537 A1* | 3/2022 | Shimada | ............. | H04L 9/3247 |
| 2023/0362640 A1* | 11/2023 | Edge | ................. | H04W 12/06 |

OTHER PUBLICATIONS

J. Song et al., "How Block Chain Can Help Enhance the Security and Privacy in Edge Computing" arXiv:2111.00416v1, Oct. 31, 2021, 6 pp.
"Identity-based encryption", Wikipedia, 6 pp. [online] [retrieved Mar. 13, 2023] https://en.wikipedia.org/wiki/Identity-based_encryption.
"Introduction to Web3", ethereum.org, last updated Mar. 10, 2023, 1 pp. [online] [retrieved Mar. 13, 2023] https://ethereum.org/en/web3/#what-is-web3.
G. Appenzeller, et al., RFC5408, "Identity-Based Encryption Architecture and Supporting Data Structures", IETF Trust, Jan. 2009, 30 pp. [online] https://datatracker.ietf.org/doc/html/rfc5408.
"Public key infrastructure", Wikipedia, 15 pp., [online][retrieved Mar. 10, 2023] https://en.wikipedia.org/wiki/Public_key_infrastructure.
"Public-key cryptography", Wikipedia, 12 pp., [online][retrieved Mar. 10, 2023] https://en.wikipedia.org/wiki/Public-key_cryptography.
Mell, P. et al., "The NIST Definition of Cloud Computing (Draft)", Sep. 2011, Computer Security Division Information Technology Laboratory National Institute of Standards and Technology, Total 7 pp.
Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
"Applied Cryptography", 5 pp., [online][retrieved Mar. 10, 2023] https://www.nccoe.nist.gov/applied-cryptography.
"bitcoin/bips", github.com, 10 pp., [online][retrieved Mar. 10, 2023] https://github.com/bitcoin/bips/blob/master/bip-0032.mediawiki.
"Digital Signature vs Digital Cedrtificate: The Difference Explained", cheapsslsecurity.com, 5 pp., [online][retrieved Mar. 10, 2023] https://cheapsslsecurity.com/blog/digital-signature-vs-digital-certificate-the-difference-explained/.
"Encryption", Wikipedia, 10 pp., [online][retrieved Mar. 10, 2023] https://en.wikipedia.org/wiki/Encryption.
"Identity-based cryptography", Wikipedia, 6 pp., [online][retrieved Mar. 10, 2023] https://en.wikipedia.org/wiki/Identity-based_cryptography.
"Identity-based encryption", Wikipedia, 5 pp., [online][retrieved Mar. 10, 2023] https://en.wikipedia.org/wiki/Identity-based_encryption.
About . . . Pairing-based cryptography, Stanford, 2 pp., [online][retrieved Mar. 10, 2023] https://crypto.stanford.edu/pbc/.
"PBKDF2", Wikipedia, 8 pp., [online][retrieved Mar. 10, 2023] https://en.wikipedia.org/wiki/PBKDF2.
"Identity Based Encryption using Pairings and Crypt::PBC", Dec. 12, 2006, 13 pp. [online] https://www.perlmonks.org/?node_id=589279.
"Recommendation for Key Management: Part 1—General", nist.gov, 2 pp., [online][retrieved Mar. 10, 2023] https://csrc.nist.gov/publications/detail/sp/800-57-part-1/rev-5/final.
"Universally unique identifier", Wikipedia, 2 pp., [online][retrieved Mar. 10, 2023] https://en.wikipedia.org/wiki/Universally_unique_identifier.
"What is Web 30 Web3 Definition guide and history", techtarget.com, 13 pp., [online][retrieved Mar. 10, 2023] https://www.techtarget.com/whatis/definition/Web-30.
"What is Web 3.0: A beginner's guide to the decentralized internet of the future", pp., [online] [retrieved 031823] https://cointelegraph.com/blockchain-for-beginners/what-is-web-3-0-a-beginners-guide-to-the-decentralized-internet-of-the-future.

* cited by examiner

| | Location Authority (LA) Based Key Exchange | Command Based Public Key Infrastructure (CB-PKI) | ID Based Encryption (IBE) with Location Authority Based Key Exchange (LAbKE) |
|---|---|---|---|
| Secret Data to be created | Common Key (e.g., random number) | Arbitrary cryptograph | Arbitrary cryptograph |
| Relevant participants (range of secret data to be shared) | Project owner (Alpha) Project Participants (Bravo, Charlie) | Local Business Platformer Project owner (Alpha) Project participants (Bravo, Charlie) | Local Business Platformer Project owner (Alpha) Project participants (Bravo, Charlie) |
| Project Owner to visit Command Base and Location Authority | Yes | Not applicable | Not applicable |
| Public Key infrastructure | Not applicable | Yes | Not applicable |
| Public Key for encryption | Not applicable | Convert command base (CB) location data to public key | Use command base (CB) location data as public key |

PROVIDING SECURITY FOR EDGE COMPUTING USING LOCATION DATA

BACKGROUND

Embodiments of the invention relate to providing security for edge computing using location data. In addition, embodiments of the invention relate to realizing autonomous, distributed computing in a region.

Edge computing may be described as an environment in which computing devices (edge devices) are close to data sources. Because the edge devices process data closer to where that data is being generated, the overall processing of the data is more efficient and better for providing real-time results.

Current Information Technology (IT) systems and edge computing systems that are connected throughout the world via, for example, the internet may be hacked remotely (from overseas).

In conventional systems, location data that is used in IT security includes: location data using an Internet Protocol (IP) address database (IP Geolocation) for personal computers and servers (in a cloud environment), location data using Global Positioning System (GPS), a mobile phone base station, and WIFI mac address geolocation for mobile devices, etc. However, these rely on complicated third-party systems and are not easy for an application to ensure that the location data (e.g., latitude, longitude) is accurate (i.e., not falsified).

SUMMARY

In accordance with embodiments, a computer program product is provided for providing security for edge computing using location data. The computer program product comprises a computer readable storage medium having program code embodied therewith, the program code executable by at least one processor to perform operations. With such embodiments, a command base location of an entity, an application identifier of the entity, and an expire date for the application identifier are determined. A message generated from the command base location and the application identifier is sent to a location authority. A signed command base location is received based on the command base location being within a jurisdiction of the location authority and a current date being before the expire date. A common key for the command base location is generated using the application identifier and the signed command base location. A public key is generated using the common key. A message is encrypted using the public key to create a cryptographic message. The cryptographic message is sent.

In accordance with other embodiments, a computer-implemented method is provided for providing security for edge computing using location data. The computer-implemented method comprises operations. With such embodiments, a command base location of an entity, an application identifier of the entity, and an expire date for the application identifier are determined. A message generated from the command base location and the application identifier is sent to a location authority. A signed command base location is received based on the command base location being within a jurisdiction of the location authority and a current date being before the expire date. A common key for the command base location is generated using the application identifier and the signed command base location. A public key is generated using the common key. A message is encrypted using the public key to create a cryptographic message. The cryptographic message is sent.

In accordance with yet other embodiments, a computer system is provided for providing security for edge computing using location data. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. With such embodiments, a command base location of an entity, an application identifier of the entity, and an expire date for the application identifier are determined. A message generated from the command base location and the application identifier is sent to a location authority. A signed command base location is received based on the command base location being within a jurisdiction of the location authority and a current date being before the expire date. A common key for the command base location is generated using the application identifier and the signed command base location. A public key is generated using the common key. A message is encrypted using the public key to create a cryptographic message. The cryptographic message is sent.

BRIEF DESCRIPTION OF THE SEVERAL VIEWS OF THE DRAWINGS

Referring now to the drawings in which like reference numbers represent corresponding parts throughout:

FIG. 10 illustrates a table comparing techniques in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide security improvement of edge devices based on a physically determined location. In addition, embodiments provide an autonomous, distributed computing environment closed within the jurisdiction (i.e., an authorization zone) of the location authority. Moreover, embodiments create a secure pathway over an unsecured pathway (e.g., the Internet) that may be used by two or more edge devices using key exchange.

Figure 1:
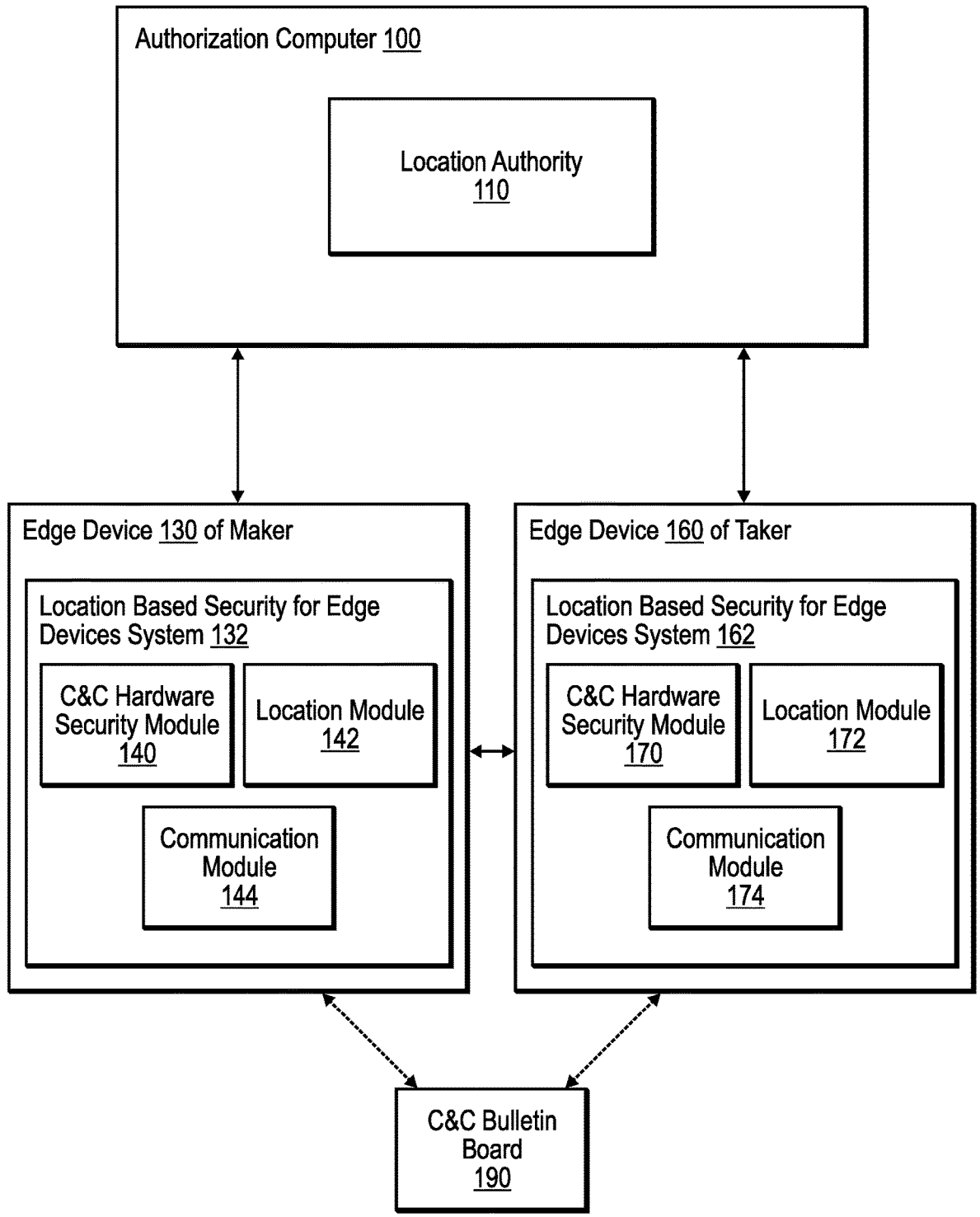
FIG. 1 illustrates, in a block diagram, a computing environment in accordance with certain embodiments.

FIG. 1 illustrates, in a block diagram, a computing environment in accordance with certain embodiments. In FIG. 1, an authorization computer 100 is connected to an edge device 130 and to an edge device 160. The edge device 130 and the edge device 160 communicate with each other using a Command & Control (C&C) bulletin board 190. In certain embodiments, the edge device 130 and the edge device 160 are connected to each other and may communicate without using the C&C bulletin board 190.

The authorization computer 100 includes a location authority (LA) 110. The edge device 130 includes a location based security for edge devices system 132, which includes a Command and Control (C&C) hardware security module 140, a location module 142, and a communication module 144. The edge device 160 includes a location based security for edge devices system 162, which includes a Command and Control (C&C) hardware security module 170, a location module 172, and a communication module 174.

The C&C bulletin board 190 for edge computing enables edge devices 130, 160 to accept commands received from other edge devices 130, 160 within the jurisdiction of the location authority (LA)110. The C&C bulletin board 190 may be described as a messaging channel or other communication channel.

The location modules 142, 172 may be used to identify a location (latitude, longitude), via, for example, GPS, a map or a text location. The communication modules 144, 174 may be used to send and receive messages via a 5G network, wifi, etc. The C&C hardware security modules 140, 170 work with the respective location modules 142, 172 and the respective communication modules 144, 174.

The C&C hardware security modules 140, 170 may be used to control the respective edge devices 130, 160. With embodiments, the C& C hardware security modules 140, 170 use proximity communication (e.g., Near Field Communication (NFC), wire, etc.) to communicate with the location authority (LA) 110. The C& C hardware security modules 140, 170 record the location data while visiting a command base (CB) location and then move to the vicinity of the location authority (LA) 110 to get the common key (i.e., the secret key) by using proximity communication. The C&C hardware security modules 140, 170 have the capability to create/hold secret keys and to perform encrypt/decrypt operations.

In certain embodiments, the C&C hardware security modules 140, 170 include a GPS module, while in other embodiments, the location modules 142, 172 are used to identify the location (latitude, longitude). In certain embodiments, the C&C hardware security modules 140, 170 use a 5G network or wifi for remote communication via the communication modules 144, 174. Also, the C&C hardware security modules 140, 170 have tamper resistant characteristics capable of securely holding the common key and other data.

In certain embodiments, the C&C hardware security modules 140, 170 are physical computing devices that may safeguard and manage digital keys, perform encryption and decryption functions for digital signatures, perform authentication, as well as other cryptographic functions. A C&C hardware security module 140, 170 may be integrated with a small edge device, while a detachable C&C hardware security module 140, 170 may be attached to a large device (e.g., a construction machine). For example, the C&C hardware security modules 140, 170 may come in the form of a plug-in card or an external device that attaches directly to an edge device 140, 170.

In certain embodiments, a closed control environment is limited to a group of edge devices 130, 160 that are at a command base location (CB) ("location"). With embodiments, the command base location (CB) is a location within the jurisdiction of the location authority (LA)110. The command base location (CB) may itself be a region. The edge device 130, 160 are able to communicate with the location authority (LA)110 via proximity communication.

The C&C hardware security modules 140, 170 may be provided at both an edge device 140, 170 used by a person who issues commands and the edge device 170 that receives the commands. That is, the C& C hardware security modules 140, 170 are at both the first edge device used by a person who operates a second edge device (e.g., a construction machine) and the second edge device (e.g., the construction machine) to be operated.

In certain embodiments, functions of a C&C hardware security module 140, 170 include, for example, onboard secure cryptographic key generation, secure cryptographic key storage, key management, and performing encryption or digital signature functions. The C&C hardware security modules 140, 170 may support symmetric and asymmetric cryptography. For some applications, such as certificate authorization and digital signing, public-key cryptography is used by the C&C hardware security module 140, 170.

Figure 2:
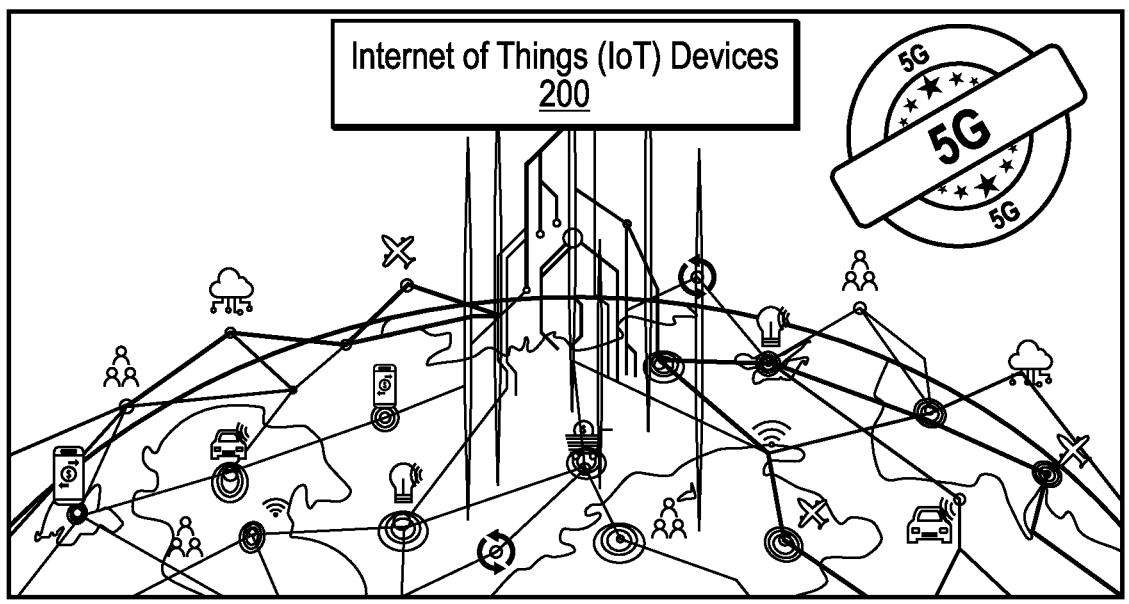
FIG. 2 illustrates an example of edge devices in accordance with certain embodiments.

FIG. 2 illustrates an example of edge devices in accordance with certain embodiments. In FIG. 2, there are a number of Internet of Things (IoT) devices 200, which may be described as a type of edge devices. Each IoT device communicates with at least one other IoT device. In this example, the IoT devices 200 communicate via a 5G network. Examples of IoT devices 200 include vehicles (e.g., cars, ships, airplanes, etc.), devices in homes (e.g., smart alarm system, smart appliances, etc.), etc.

Figure 3:
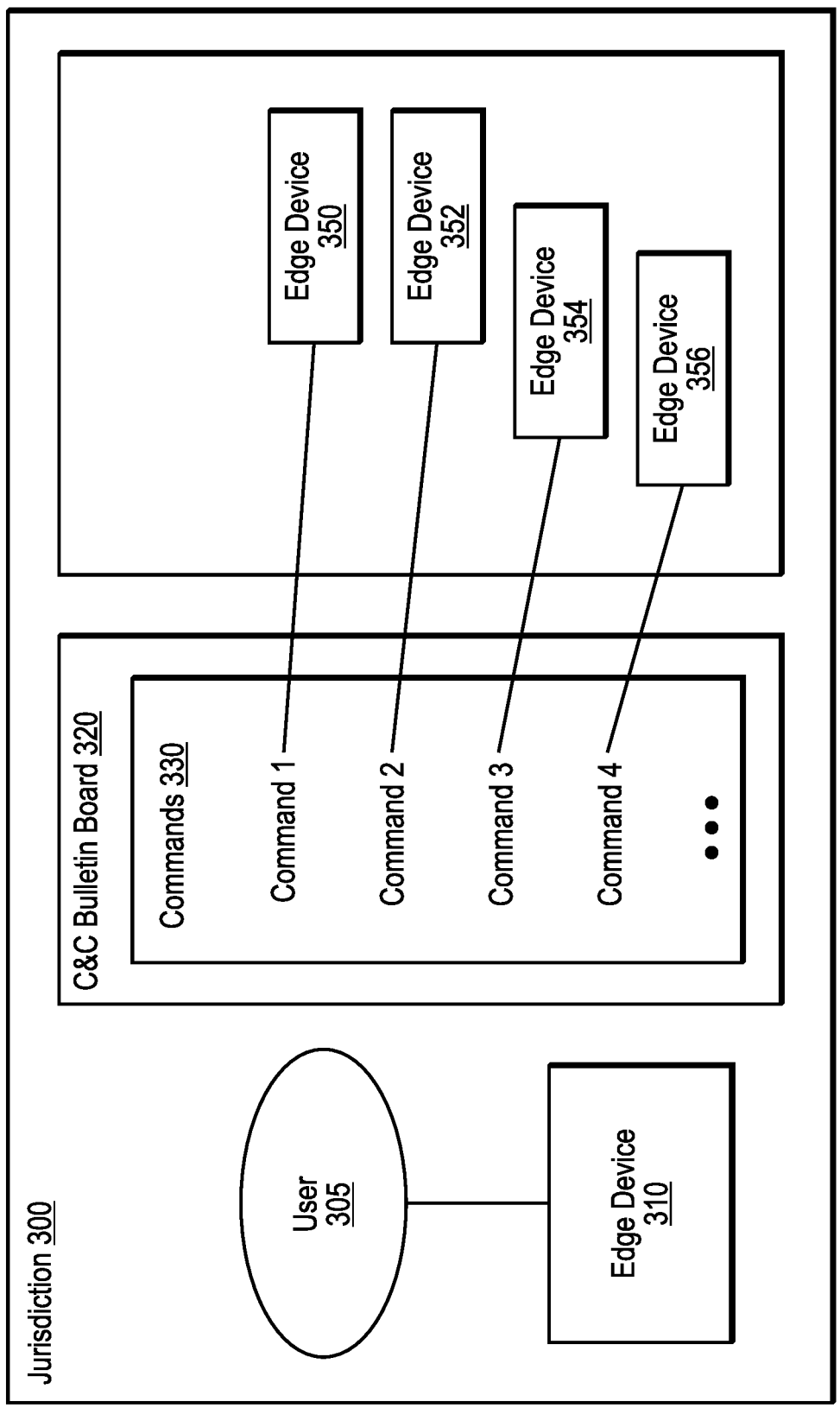
FIG. 3 illustrates an example of using an edge device to issue commands to other edge devices in accordance with certain embodiments.

FIG. 3 illustrates an example of using an edge device to issue commands to other edge devices in accordance with certain embodiments. In FIG. 3, within a jurisdiction 300 (e.g., a construction zone), a user 305 uses an edge device 310 to issue (i.e., post) commands 330 to the C&C bulletin board 320, and the edge devices 350, 352, 354, 356 (e.g., construction machines) read the commands 330 from the C&C bulletin board 320. With embodiments, each of the edge devices 310, 350, 352, 354, 356 independently accesses the location authority (LA)110 to be authenticated and to receive a key (e.g., a common key or a public key that is associated with a private key) for use in encrypting and decrypting messages, such as the commands 350 and responses to the commands 350.

Figure 4:
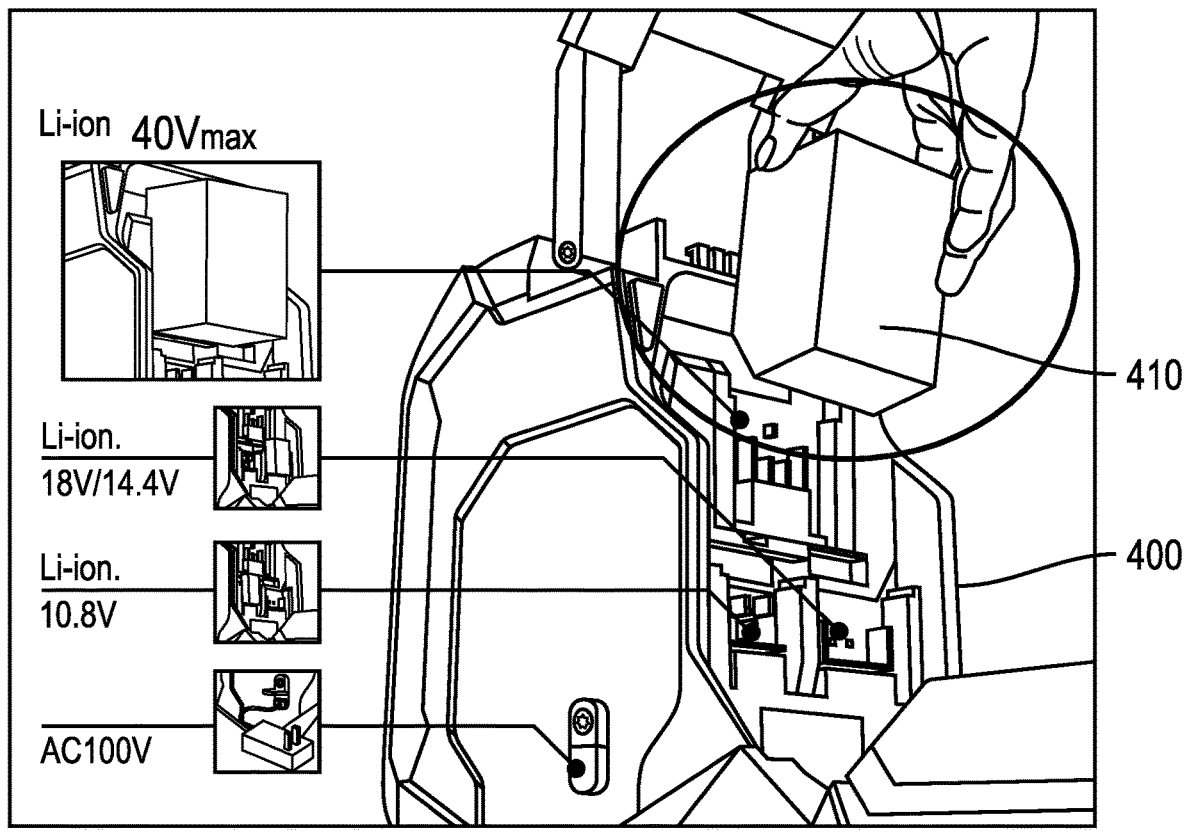
FIG. 4 illustrates an example C&C hardware security module attached to a large device in accordance with certain embodiments.

FIG. 4 illustrates an example C&C hardware security module 410 attached to a large device 400 in accordance with certain embodiments. In this example, the C&C hardware security module 410 may be detached and attached to another large device. That is the same C&C hardware security module 410 may be used to control different large devices.

Certain embodiments provide a C&C bulletin board for a mining construction site in a region in which construction machines (e.g., unmanned dump tracks, excavators, etc.) are activated. In this example, the edge devices 130, 160 use a C&C bulletin board to operate and control the construction machines relevant to mining construction in a specific region, which is in the jurisdiction of the location authority (LA)110. Embodiments also provide an encrypted communication channel (e.g., the C&C bulletin board) for the edge devices 130, 160, which may be used by those edge devices 130, 160 within the region.

In certain embodiments, the edge device 130 is used by an operator, and the edge device 160 is attached to a machine. In such embodiments, the operator writes messages (e.g., commands) and the machine reads the messages (e.g., commands) in a C&C bulletin board. The machine may write messages (e.g., regarding errors).

Embodiments also provide a decentralized model leaving no trace of secret data to local authorities is provided taking into account Web 3.0 or Web3 (i.e., the third generation of the World Wide Web) features.

In certain embodiments, because Global Positioning System (GPS) data may be fabricated, the location authority (LA)110 is established physically for a jurisdiction and those who administer or operate edge devices 130, 140 come to the command base location (CB) within the jurisdiction and physically access (e.g., "touch" via proximity communication) the edge devices 130, 140 within that jurisdiction. This is to ensure that those who administer or operate edge devices are present in the jurisdiction of the location authority (LA)110.

In certain embodiments, the location authority (LA) 110 is associated with a jurisdiction. In certain embodiments, the authorization computer 100 with the location authority (LA) 110 is located within a jurisdiction. The location authority (LA) 110 may be at a physically established facility as represented by a certain jurisdiction (e.g., territory), such as city and town. The jurisdiction may also be a city office, a public monument, an unmovable installed object, a commercial facility, etc. The jurisdiction may represent any region. With embodiments, secret data are exchanged (with digital signature) with edge devices 130, 160 using the C&C hardware security modules 140, 170 via wired or proximity communication. With embodiments, the command base location (CB) (e.g., latitude, longitude) presented by the edge devices 130, 160 using the C&C hardware security modules 140, 170 is confirmed to be transmitted within the jurisdiction (jurisdiction that is being visited), and the command base location (CB) is ensured by digital signature by the C&C hardware security modules 140, 170.

With embodiments, using a physical facility location authority (LA) 110 enables certifying that an edge device used by a person physically visited a region under jurisdiction of the location authority (LA)110. A common mechanism is provided to allow various edge devices to utilize the visit certificate. A visit certificate may be described as a signature from the location authority (LA)110 that indicates that the edge device was at a particular location.

Figure 5:
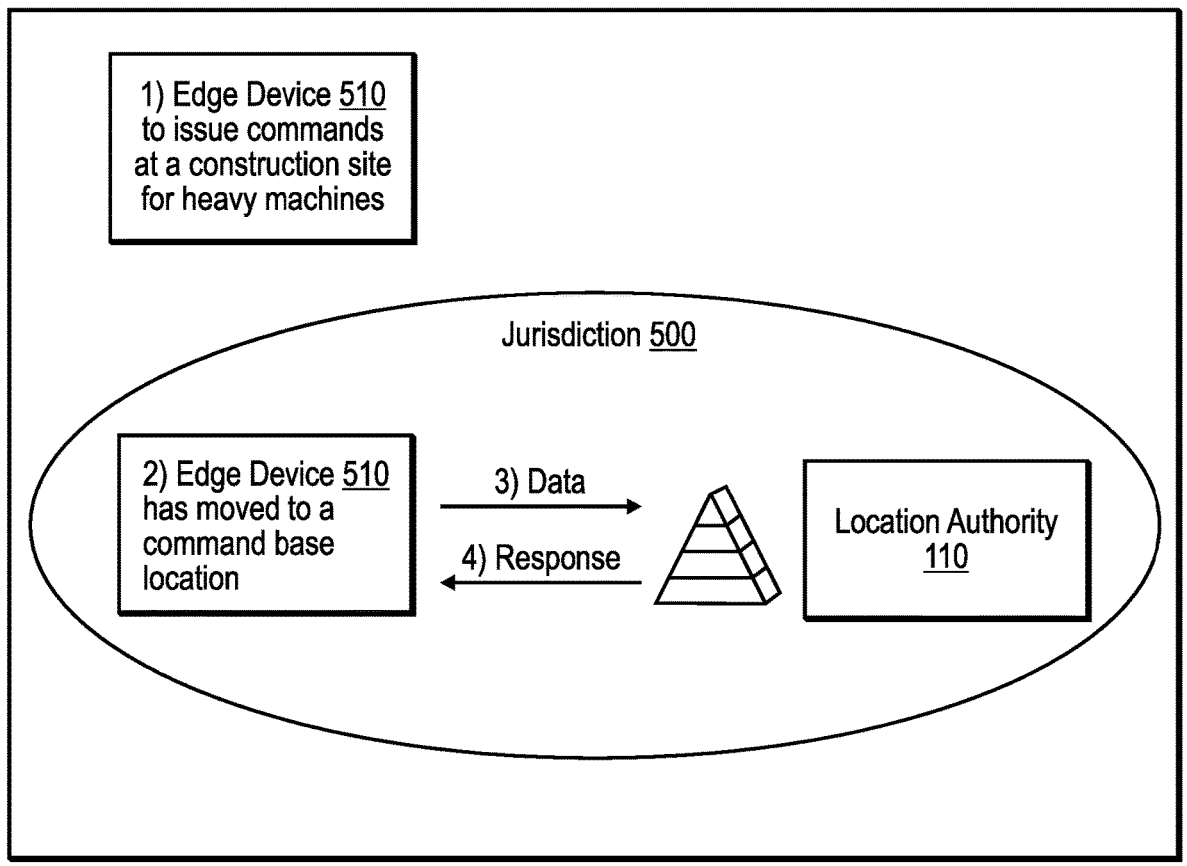
FIG. 5 illustrates interactions of an edge device and a location authority in accordance with certain embodiments.

FIG. 5 illustrates interactions of an edge device 510 and a location authority (LA)110 in accordance with certain embodiments. In FIG. 5, there is a location authority (LA) 110 within a jurisdiction 500. In this example, there is an edge device 510 that issues commands to construction machines at a construction site (1). The edge device 510 is initially outside the jurisdiction 500, but the edge device 510 moves to a command base location (CB) in the jurisdiction 500 (2). The edge device 510 sends data (including a command base location (CB) and an application identifier (APPID or application ID)) via proximity communication to the location authority (LA)110 (3). The location authority (LA)110 returns a response (4) to the edge device 510. In this example, because the edge device 510 has moved to the command base location (CB) within the jurisdiction 500 before sending the data, the location authority (LA) 110 returns a signed command base location (SCB). In this manner, the location authority (LA)110 determines that the edge device at least visited the jurisdiction 500, and this prevents falsifying the GPS data, especially from outside the jurisdiction (e.g., overseas).

In certain embodiments, pre-shared data (notification data) include a command base location (CB) (e.g., latitude, longitude) and an application ID (APPID). In certain embodiments, the application ID (APPID) identifies an application for the C&C bulletin board (that runs on the internet, cloud, etc.) that the edge devices 130, 160 use. In certain embodiments, the application ID (APPID) is a name that is long enough to avoid collision and may be a Universally Unique Identifier (UUID). In certain other embodiments, the application ID (APPID) may identify any entity (e.g., edge device, user, etc.). In certain embodiments, an administrator who creates the command base location (CB) and the application ID (APPID) shares this with users (e.g., construction participants).

The command base location (CB) may be regarded as a base or location from which edge devices, such as construction machines, are controlled. For example, the command base location (CB) may be a representative point in a mining construction site.

In certain embodiments, the command base location (CB) and the application ID (APPID) may be determined by an administrator of edge devices for a construction project and shared with (via sending notification to) construction staff. With embodiments, a different application ID (APPID) may be used for each application (e.g., for different construction work). In certain embodiments, examples of applications are ones that run an unmanned dump truck, excavator, etc.

With certain embodiments, the location authority (LA) 110 is provided to ensure no falsification of location data of the command base location (CB) obtained by edge devices 130, 160 via GPS, etc. Embodiments are based on a zero-trust idea as false location data may be provided. Therefore, the location authority (LA) 110 physically (geographically) exists and provides a digital signature for a message to provide an approximate value of an unfalsified command base location (CB).

With certain embodiments, the edge device 130 physically goes to the command base location (CB). The use of a camouflaged command base location (CB) being used on the C&C hardware security module without physically going to the command base location (CB) is treated as a possibility. In some embodiments, the command base location (CB) location is set as a point in a map application of the C&C hardware security module 140, 170 and is not regarded as a camouflaged command base location (CB).

Embodiments allow generation of a common key (ComKey) based on the command base location (CB) with the location authority (LA)110 signing a message including the command base location (CB) location.

In other words, embodiments improve security by introducing a physical (geographical) aspect to the cyber space (IT world) in which the location authority (LA)110 physically exists at the site.

In certain embodiments, the "maker" and "taker" are roles in setting up the cryptographic ceremony. For example, the edge device 130 may be used by a maker, (such as an administrator (e.g., of a mining site), a project owner, etc.), while the edge device 160 may be used by taker (such as a construction participant, operator of a construction machine, etc.). Once the common key is generated by the maker and by the taker, either the "taker" or the "maker" role may issue commands and the "taker" role may execute the commands.

In certain embodiments, the edge device 130 establishes the C&C bulletin board and sends the command base location (CB) and the application ID (APPID) to construction participants at the edge device 160.

Figure 6:
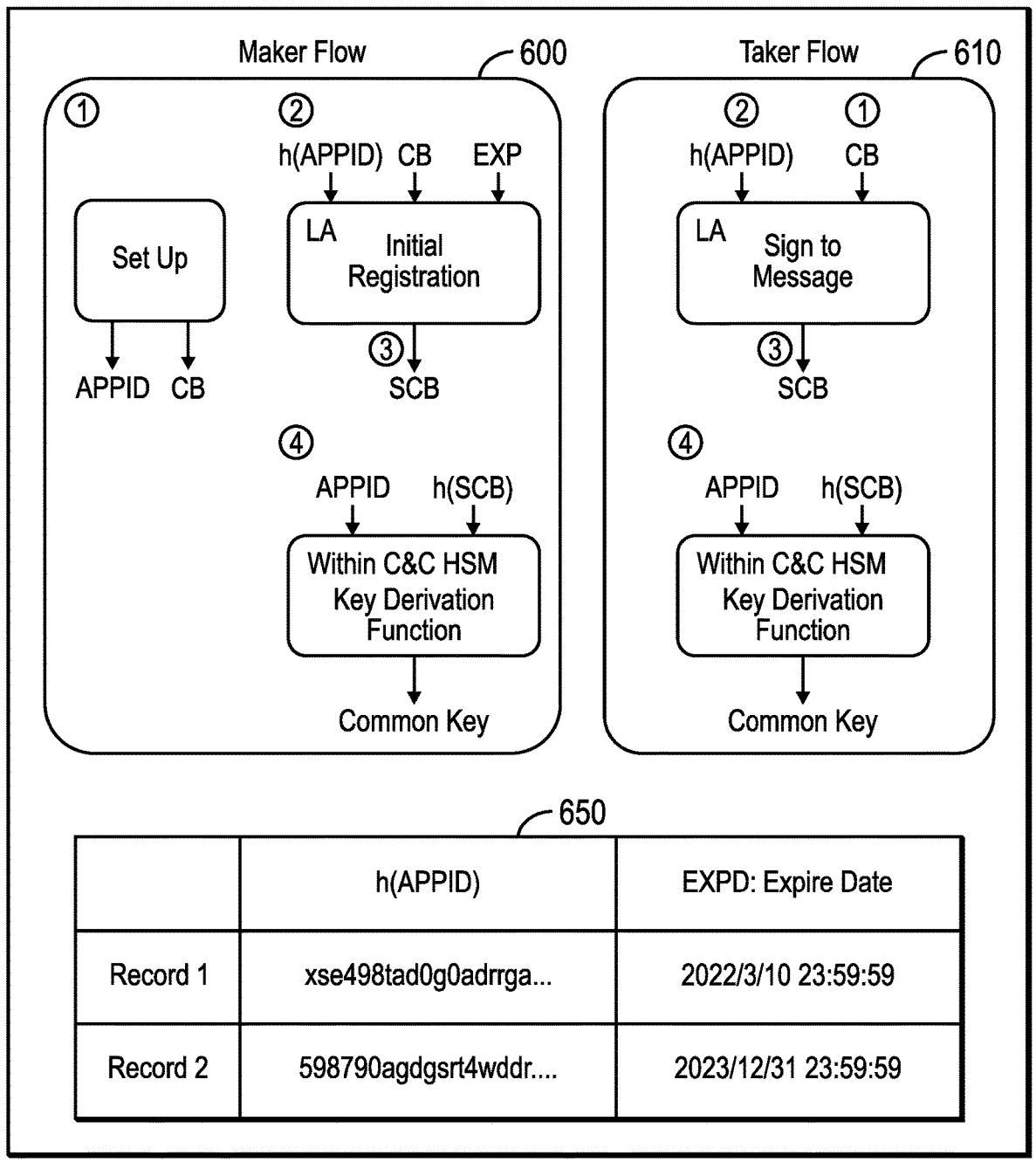
FIG. 6 illustrates logic flow for a location authority-based key exchange in accordance with certain embodiments.

In some embodiments, a common key is issued to a visitor via a location authority (LA)110 key exchange. FIG. 6 illustrates logic flow for a location authority-based key exchange in accordance with certain embodiments. In FIG. 6, a common key may be issued to a visitor at the command base location (CB). In this example, the maker is carrying an edge device 130 with a C&C hardware control module 140 to control an edge device 160. For the maker flow 600, the set up includes the C&C hardware control module 140 recording the latitude, longitude obtained via GPS while located at the command base location (CB), which is the maker CB. For set up, the C&C hardware control module 140 also sets an application ID (APPID) with an expire date (EXPD) for use in creating a message (MSG) and M-MSG, respectively, and sends (e.g., via proximity communication) these to the location authority (LA)110. In certain embodiments, the expire date (EXPD) may be a date and time value.

$$MSG=CB+h(\text{APPID})$$

$$M\text{-}MSG=MSG+EXP$$

The hash value of the application ID (APPID) is denoted by h(APPID). For initial registration, the location authority (LA)110 saves the hash of the application ID (h(APPID)) and the expire date (EXPD) in the table 650 until the expire date (EXPD) value. The location authority (LA)110 also signs the message MSG=CB+h(APPID). In particular, if the application ID (APPID) has not expired (i.e., the expire date (EXPD) associated with the hash of the application ID (h(APPID)) has not been reached) based on the expire date (EXPD) and the command base location (CB) is within the jurisdiction, the location authority (LA)110 uses the hash of the application ID (h(APPID)) and the command base location (CB) to output the signed command base location (SCB).

For generating the common key, the C&C hardware security module 140 processes the signature received from the location authority (LA)110 as the signed command base location (SCB) to create a common key based on the application ID (APPID) and the h(SCB) using a key derivation function such as PBKDF2.

$$\text{Common key}=PBKDF2(\text{APPID},h(SCB),\dots)$$

In particular, the C&C hardware security module 140 uses the application ID (APPID) and the hash of the signed command base (h(SCB)), performs a key derivation function, and outputs the common key.

The maker notifies the taker of the maker CB and the application ID (APPID).

For the taker flow 610, a taker is carrying an edge device 160 with a C&C hardware security module 170 participating in an operation (e.g., this may be a construction machine that is performing a command). The C&C hardware control module 170 records the latitude, longitude obtained via GPS while being located in the command base location (CB), which is the taker CB. Then, the C&C hardware control module 170 creates a message MSG based on the hash of the application ID (h(APPID)) and the command base location (CB) and sends these (e.g., via proximity communication) to the location authority (LA)110.

$$MSG=CB+h(\text{APPID})$$

The location authority (LA)110 signs the message MSG when the command base location (CB) is within a jurisdiction and h(APPID) is confirmed to fall within the expire date (EXPD) through examination of the table 650. The C&C hardware control module 170 processes the received signature as signed command base location (SCB) to create a common key based on the application ID (APPID) and the hash of the signed command base (h(SCB)) using a key derivation function, such as PBKDF2.

In particular, for generating the signed command base location (SCB), the location authority (LA)110 receives the hash of the application ID (h(APPID)) and the command base location (CB), signs the message MSG, and outputs the signed command base location (SCB). For generating the common key, the C&C hardware security module 170 receives the application ID (APPID) and the hash of the signed command base (h(SCB)), performs a key derivation function, and outputs the common key.

In certain embodiments, secret data may be exchanged using the common key shared by the C&C hardware security module 140 and the C&C hardware security module 170. An example of secret data is: Move 5 acres of earth and sand from area X to area Y. The common key may be used for both encryption and decryption.

In certain embodiments, there is a Web3 feature in which the location authority (LA)110 is unable to decrypt the secret data because data is passed to the location authority (LA) 110 in the form of the application ID (APPID) hash value.

In certain embodiments, the signature of the same MSG has the same value. Embodiments may use Rivest-Shamir-Adleman (RSA) and RFC6979 for Elliptic Curve Digital Signature Algorithm (ECDSA). In certain embodiments, there is deterministic usage of the Digital Signature Algorithm (DSA) and ECDSA.

Figure 7A:
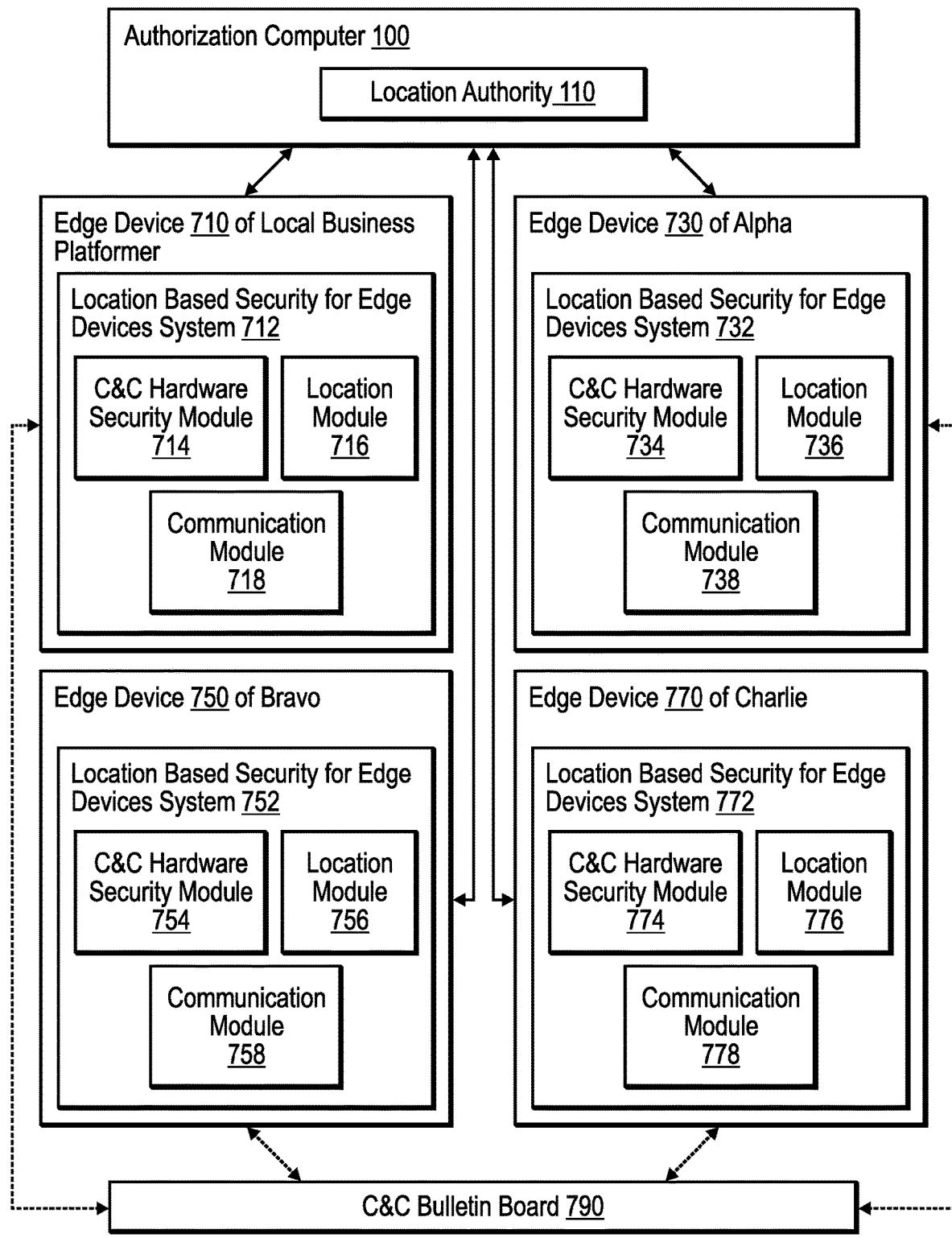
FIG. 7A illustrates, in a block diagram, anther computing environment in accordance with certain embodiments.

FIG. 7A illustrates, in a block diagram, anther computing environment in accordance with certain embodiments. In FIG. 7A, an authorization computer 100 is connected to edge devices 710, 730, 750, 770. The edge devices 710, 730, 750, 770 communicate with each other using the C&C bulletin board 790. In certain embodiments, the edge devices 710, 730, 750, 770 are connected to each other and may communicate without using the C&C bulletin board 790.

The authorization computer 100 includes a location authority (LA) 110. Each edge device 710, 730, 750, 770 includes, respectively, a location based security for edge devices system 712, 732, 752, 772. Each location based security for edge devices system 712, 732, 752, 772 includes, respectively, a Command and Control (C&C) hardware security module 714, 734, 754, 774, a location module 716, 736, 756, 776, and a communication module 718, 738, 758, 778.

The edge devices 710, 730, 750, 770 use public key encryption using location data as a public key in accordance with certain embodiments. With certain embodiments, there is no initial visit to the command base location (CB) within the jurisdiction of the location authority (LA) 110 at the start of the flow. Certain embodiments use location data public key distribution Public Key Infrastructure (PKI). Other embodiments use an ID based encryption pattern using the location authority-based key exchange.

Embodiments realize public key encryption using a certain command base location (CB) (i.e., latitude, longitude) as a public key. Also, with embodiments, a cryptograph creator/business owner (Alpha) is a type of entity using the edge device 730, and Alpha may create a cryptograph remotely without visiting the command base location (CB) physically. Cryptanalyst/application participants Bravo and Charlie are another type of entity using the respective edge device 750, 770, and Bravo and Charlie physically visit the command base location (CB). In addition, a local business platformer is another type of entity using the edge device 710. With embodiments, the local business platformers, Alpha, Bravo, and Charlie represent edge devices.

Figure 7B:
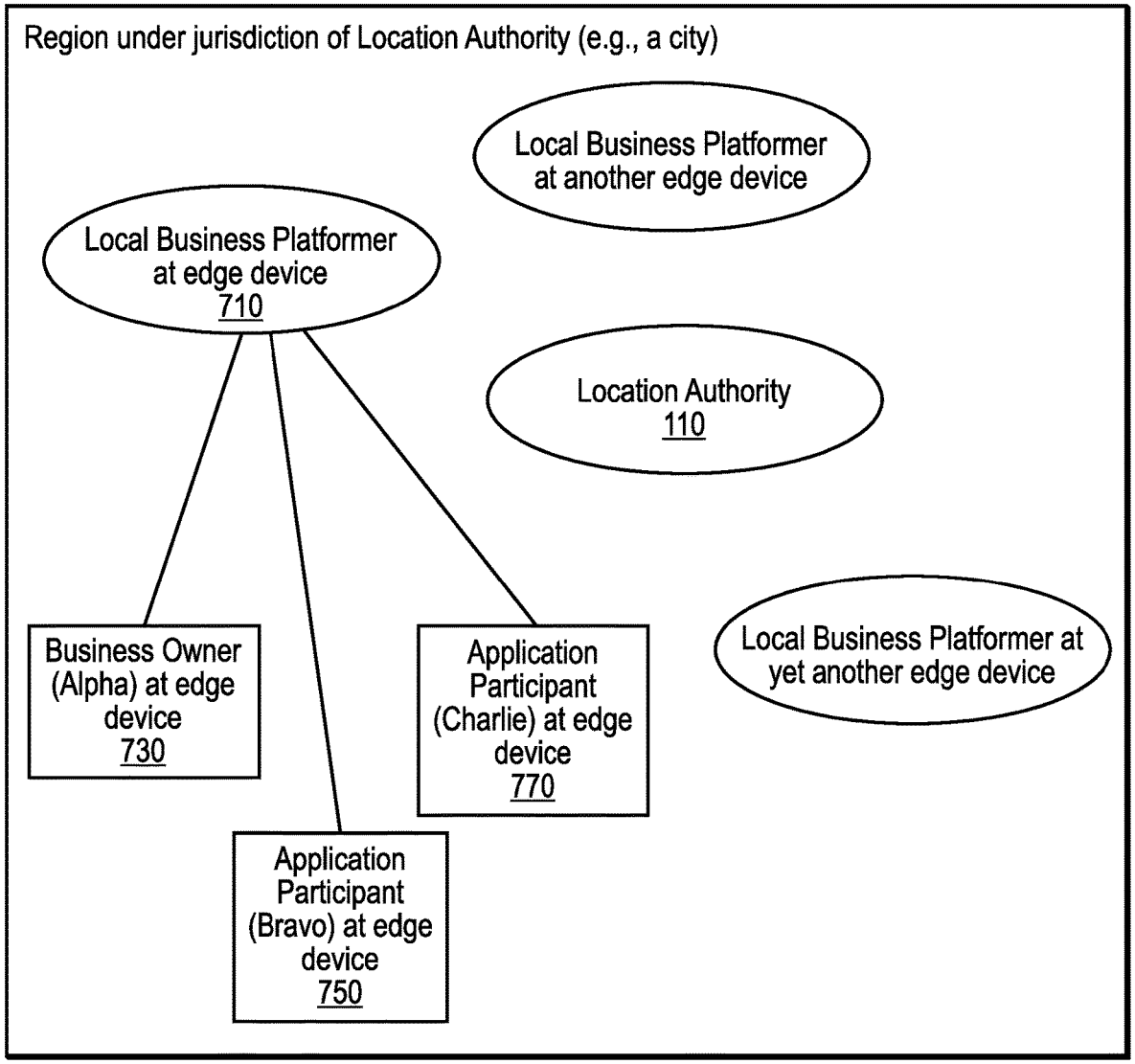
FIG. 7B illustrates public key encryption using location data as a public key in accordance with certain embodiments

FIG. 7B illustrates public key encryption using location data as a public key in accordance with certain embodiments. In FIG. 7B, the region under the jurisdiction of the location authority (LA) 110 (e.g., a local city) includes several local business platformers (a type of entity using an edge device), a location authority (LA) 110, a business owner (a type of entity using an edge device), and application participants (a type of entity using an edge device).

Unlike the location authority-based key exchange, for public key encryption using location data as a public key, the role of the maker is divided into a local business platformer (LBP) and a business owner (Alpha). By dividing the role of initial set up into local business platformer and the business owner, a workload of the business owner, including creation of the C&C bulletin board, is reduced. Also, the business owner may start a project without visiting the command base location (CB).

With location authority-based key exchange, there is random sharing of secret data (e.g., the common key), whereas public key encryption using location data allows arbitrary exchange of cryptographic messages (i.e., encrypted messages or crypto messages).

In certain embodiments, a decentralized model is provided to allow the presence of several independent local business platformers in one region and to realize decentralization, such as arbitrary selection of a local business platformer by the business owner, without leaving a trace of secret data to location authorities, while continuously placing importance on Web3 features.

While a local business platformer shares secret data with application participants, several local business platformers are allowed to operate in a region and may be selected by users so that an entity that consolidates management of the secret data does not exist.

In one example use case, an edge C&C bulletin board allows those who came to the region and their edge devices to read/write (e.g., messages, commands, etc.). A local business platformer may be described as an edge C&C bulletin board managing entity in the region. Alpha may be described as an edge C&C bulletin owner for a construction work project. Bravo and Charlie may be described as edge C&C bulletin users (who read/write). In certain embodiments, plaintext m is a password or access token, etc. (for authentication of RFC6750) to use the edge C&C bulletin.

In another example use case, a cryptograph channel may be used by those who came to the region. A local business platformer may be an administrator of the edge C&C cryptograph channel in the region. Alpha may be a supervisor or project owner who controls edge devices. Bravo and Charlie may be participants involved in the construction project with the use of edge devices. In certain embodiments, plaintext m is a command and control message. Example techniques to exchange cryptographs among edge devices include a peer-to-peer C&C bulletin board technique, etc.

In certain embodiments, a PKI version of a location data public key distribution is provided. For set up, the local business platformer determines an application ID (APPID) and creates a common key using location authority-based key exchange for the location data (latitude, longitude, four decimal places, etc.) within the jurisdiction. The C&C hardware security module uses the common key as a seed to create a private key according to a deterministic technique and simultaneously creates a corresponding public key. In certain embodiments, a command base location (CB)-Public Key Infrastructure (CB-PKI)(e.g., Domain Name System (DNS)) is used to return the public key corresponding to each location (latitude, longitude) (e.g., of multiple local business platformers). The application ID (APPID) and CB-PKI are disclosed to users (e.g., to Bravo and Charlie). In certain embodiments, the CB-PKI stores the latitude and longitude of the command base location (CB) with the associated public key.

For encryption, the cryptograph creator Alpha determines the command base location (CB) (latitude, longitude), obtains the public key remotely from CB-PKI, encrypts a text using the public key, and transmits (discloses) the encrypted text to the cryptanalyst Bravo and/or Charlie.

For decryption, the cryptanalyst Bravo or Charlie visits the command base location (CB) and the location authority (LA) 110 and obtains the common key, along with the private key created thereby, corresponding to command base location (CB) to decrypt the cryptograph.

In public-key cryptography, there are two keys: one to encrypt and another to decrypt. The encryption key is called a public key (PubKey) and is generally considered publicly available to any party wanting to send a cryptographic message (c) to a receiving party. The decryption key, used to decrypt the cryptographic message (c), is called a private key (PriKey) and is typically not shared between parties.

Figure 8:
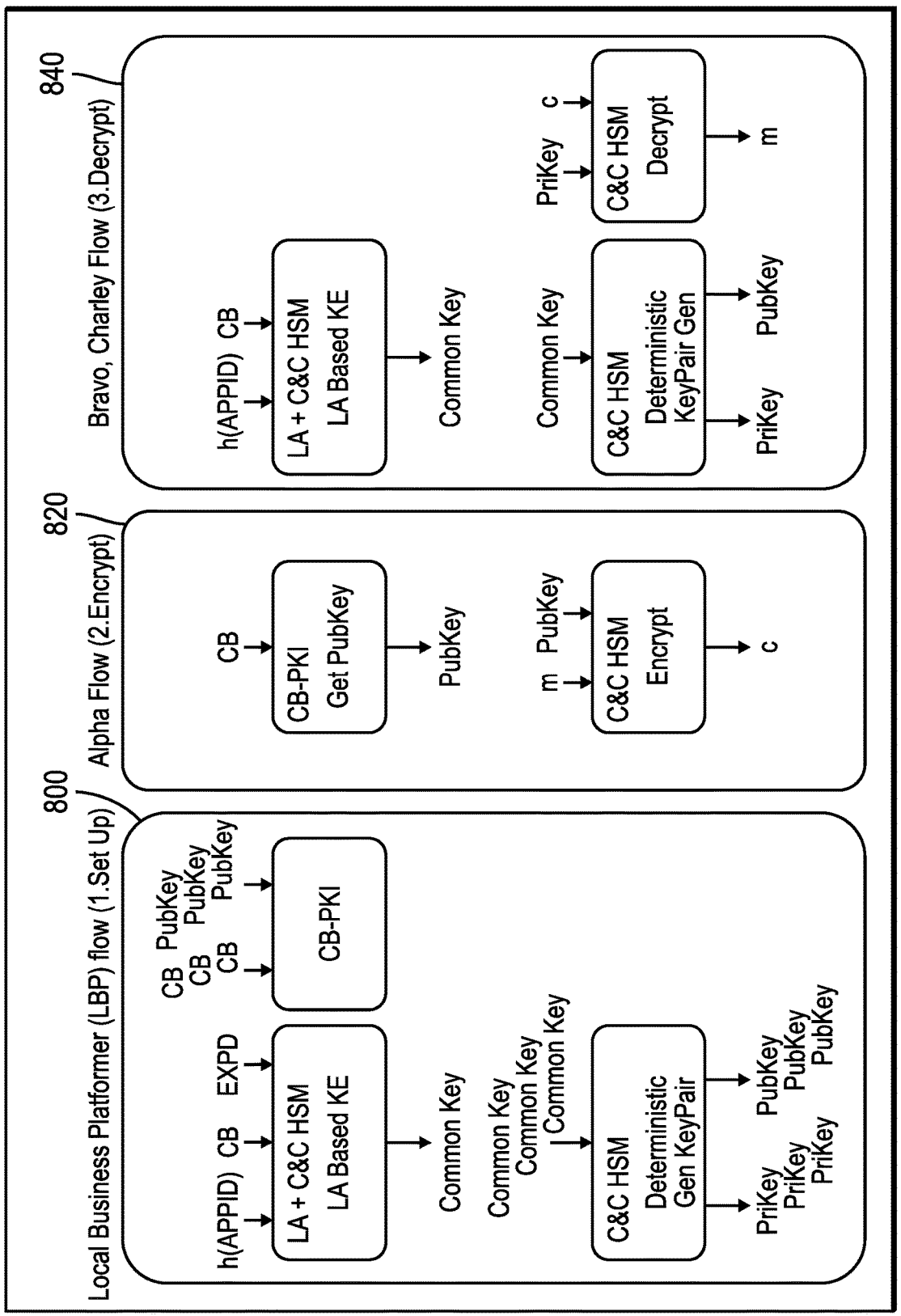
FIG. 8 illustrates logic flow for using a command base location public key and Public Key Infrastructure (PKI) in accordance with certain embodiments.

FIG. 8 illustrates logic flow for using a command base location (CB) public key and PKI in accordance with certain embodiments. With embodiments, in the set up 800, the local business platformer creates the entire set of possible PubKeys for each of the locations (longitude, latitude) to register CB-PKI. Then, if the application ID (APPID) has not expired based on the expire date (EXPD) and the command base is within the jurisdiction, location authority based key exchange uses the hash of the application ID (h(APPID)) and the command base location (CB) to generate the common key (e.g., blocks 1304-1308 of FIG. 13), and this may be done multiple times to create multiple common keys for different application IDs (APPIDs) and command base locations (CBs). Then, each common key is used to generate a corresponding key pair of a private key and a public key using deterministic generation. The CB-PKI stores the command base location (CB) and the corresponding public key, and the CB-PKI returns the public key in response to receiving the command base location (CB).

For encryption 820, the command base location (CB) is used to retrieve the public key from CB-PKI. Then, the C&C hardware security module at the Alpha edge device encrypts the message (m) with the public key to output a cryptographic message (c), which is then transmitted to the Bravo or Charlie edge device.

Figure 13:
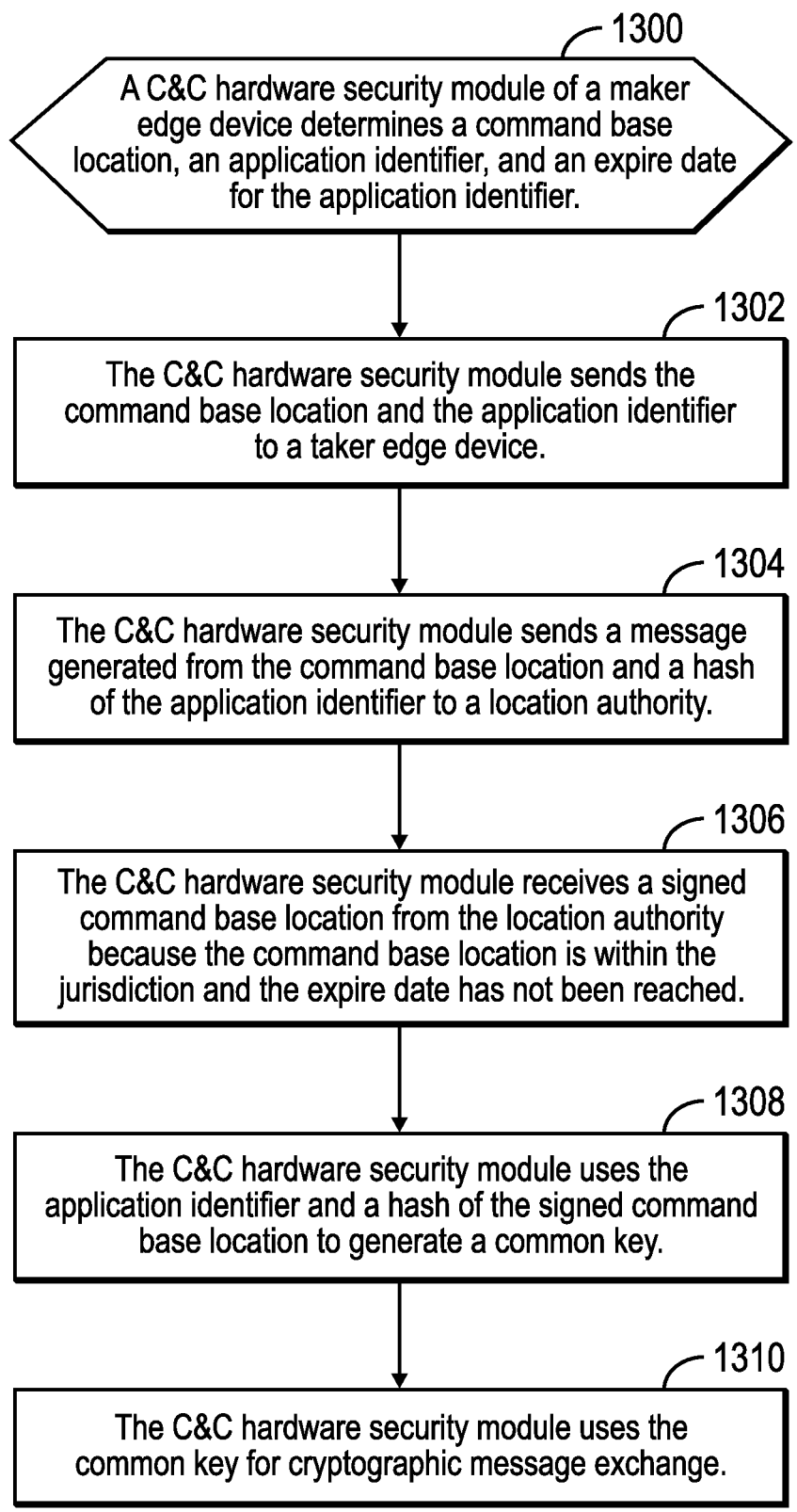
FIG. 13 illustrates, in a flowchart, operations by a maker in accordance with certain embodiments.

For decryption 840, the location authority based key exchange uses the hash of the application ID (h(APPID)) and the command base location (CB) to generate the common key (e.g., blocks 1304-1308 of FIG. 13). The common key is used to generate a corresponding key pair of a private key and a public key using deterministic generation. Then, the C&C hardware security module at the Bravo or Charlie edge device decrypts the cryptographic message (c) with the private key to output the message (m).

Certain embodiments are directed to ID Based Encryption (IBE). In particular, there is a public key encryption technique in which public data (ID) (e.g., a mailing address and location data) may be used as a public key. In such embodiments, a secret key corresponding to the ID (public key) is created by a Private Key Generator (PKG) and distributed to the ID owner.

With such embodiments, PKI (used for public key encryption) is not used for ID based encryption. In such embodiments, the PKG owns secret keys for the IDs and is able to decrypt the cryptographies. Traditional ID based encryption may be described as a centralized model with a broad authority and risk given to the PKG. That is, when considering ID based encryption using location data (latitude, longitude) as ID, PKG has secret keys for each of the command bases (CBs) (location data), but, to alleviate such a state, embodiments provide a location authority-based key exchange (hereinafter referred to as LAbKE) to allow the cryptanalysts (Bravo, Charlie) to serve as PKGs and generate the same master secret key (msk) without centralizing the PKG at one edge device.

With embodiments, the command base location (CB) and the application ID (APPID) are semi-public data provided to construction participants. Those who have received the notification and physically visited the command base location (CB) and the location authority (LA)110 may decrypt a cryptography. Furthermore, there is a Web3 feature in which the location authority (LA) 110 cannot decrypt a cryptography to provided added safeguards.

For the ID based encryption using location authority-based key exchange, set up includes Alpha determining a command base location (CB) and requesting a local business platformer for set up. The a local business platformer determines an application ID (APPID) and creates a common key based on the command base location (CB) obtained from Alpha as well as LAbKE. The a local business platformer uses secret data (the common key) created as a random number k for initial set up of IBE, creates a master secret key (msk) and IBE public key (pk), and discloses the application ID (APPID), CB, and pk (e.g., to Alpha, Bravo, and Charlie).

For encryption, Alpha adopts the command base location (CB) as the public key and uses the system public key pk to create a cryptographic message (c).

For decryption, Bravo and Charlie each obtain the secret data (the common key) from the command base location (CB) and application ID (APPID) data by using LAbKE, without being known to the location authority (LA)110. By using this secret data as the random number k for initial set up of IBE, Bravo and Charlie are able to:
1. Create a master secret key (msk) of IBE,
2. Create a secret key dID for own command base location (CB), and
3. Use pk and dID to decrypt the cryptographic message (c) and, thus, obtain the plaintext m (i.e., the decrypted message (m)).

Figure 9:
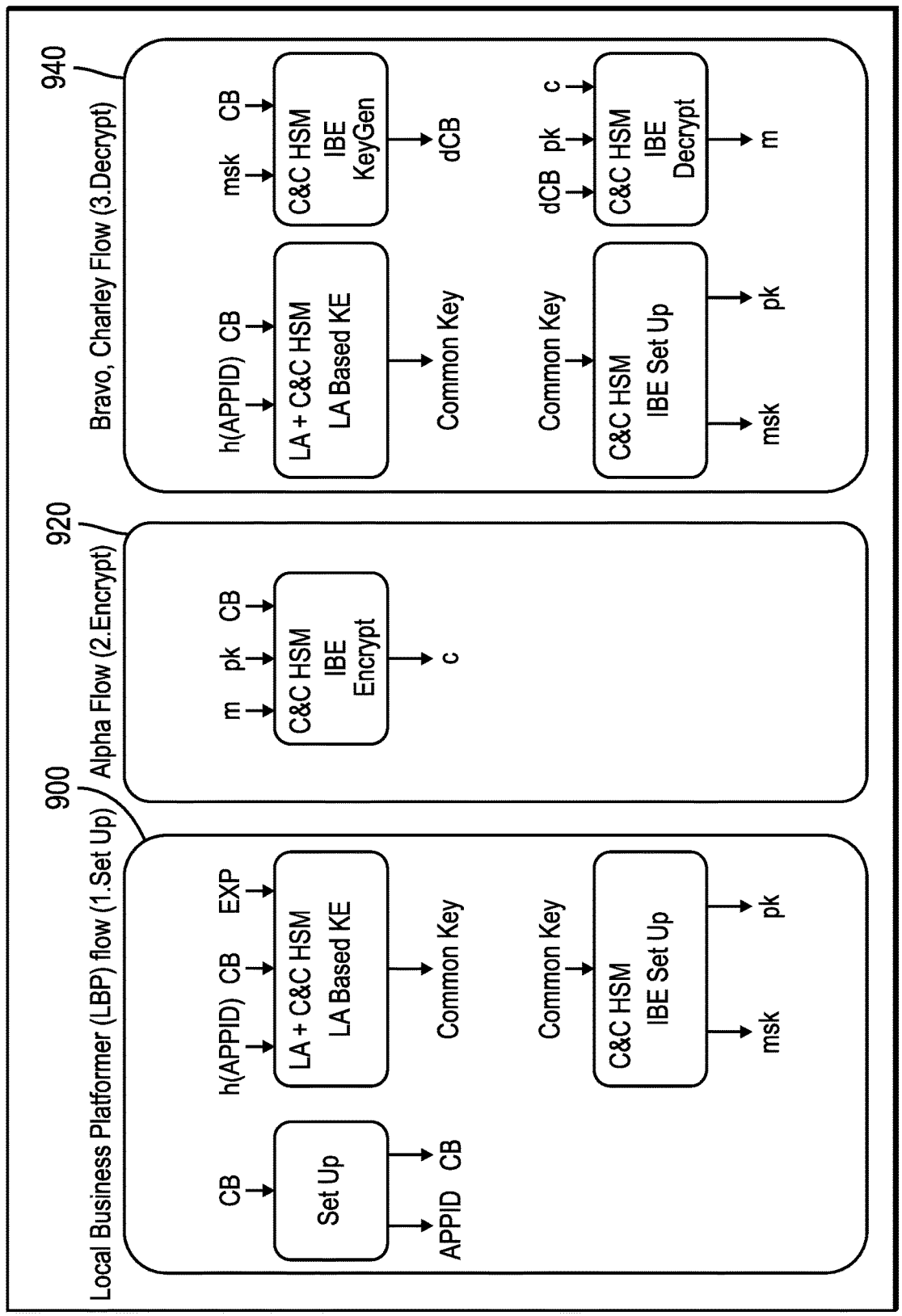
FIG. 9 illustrates ID based encryption use location authority-based key exchange in accordance with certain embodiments.

FIG. 9 illustrates ID based encryption use location authority-based key exchange in accordance with certain embodiments. For set up 900, the command base location (CB) and the application ID (APPID) are generated. Then, if the application ID (APPID) has not expired based on the expire date (EXPD) and the command base is within the jurisdiction, the location authority based key exchange uses the hash of the application ID (h(APPID)) and the command base location (CB) to generate the common key (e.g., blocks 1304-1308 of FIG. 13). Then, the ID based encryption uses the common key to generate a master secret key (msk) and an IBE public key (pk).

For encryption 920, the ID based encryption receives the message (m), the IBE public key (pk), and the command base location (CB) and outputs the cryptographic message (c), which is a cryptographic message (c). The message (m) is encrypted with the public key and the command base location (CB).

For decryption 940, the location authority based key exchange uses the hash of the application ID (h(APPID)) and the command base location (CB) to generate the common key (e.g., blocks 1304-1308 of FIG. 13). The ID based encryption uses the common key to generate a master secret key (msk) and an IBE public key (pk). The ID based encryption uses the master secret key (msk) and the command base location (CB) to output the private key of that command base location (dCB). The ID based encryption uses the private key of that command base location (dCB), the IBE public key (pk), and the cryptographic message (c) to output the decrypted message (m).

FIG. 10 illustrates a table 1000 comparing techniques in accordance with certain embodiments. In particular, table 1000 compares the location authority-based key exchange technique, the command base location (CB) Public Key Infrastructure technique, and the ID based encryption using a location authority-based key exchange technique. In certain embodiments, for the location authority-based key exchange technique, Alpha may be a maker, while Bravo and Charlie may be takers.

In certain embodiments, once a key (either a common key or a public key that is part of a public-private key pair) is obtained at the location authority (LA)110, the key can continue to be used, taking into consideration key expiration dates, revocation of keys, and rotation of keys. In certain embodiments, key rotation (renewal) and creation of new keys may be performed with a visit to the command base or the location authority (LA)110.

In certain embodiments, key expiration and revocation information may be managed using the key based on: case1: APPID+CB (managed by the maker) and case2: h(APPID)+CB (managed by the maker or the location authority (LA) 110).

Since the location authority (LA) 110 knows the hash value of the application ID (h(APPID)), the location authority (LA)110 manages the validity of the key for case2.

With reference to Web3 features, the key of case1 is known to the parties concerned, but not the location authority (LA)110.

Figure 11:
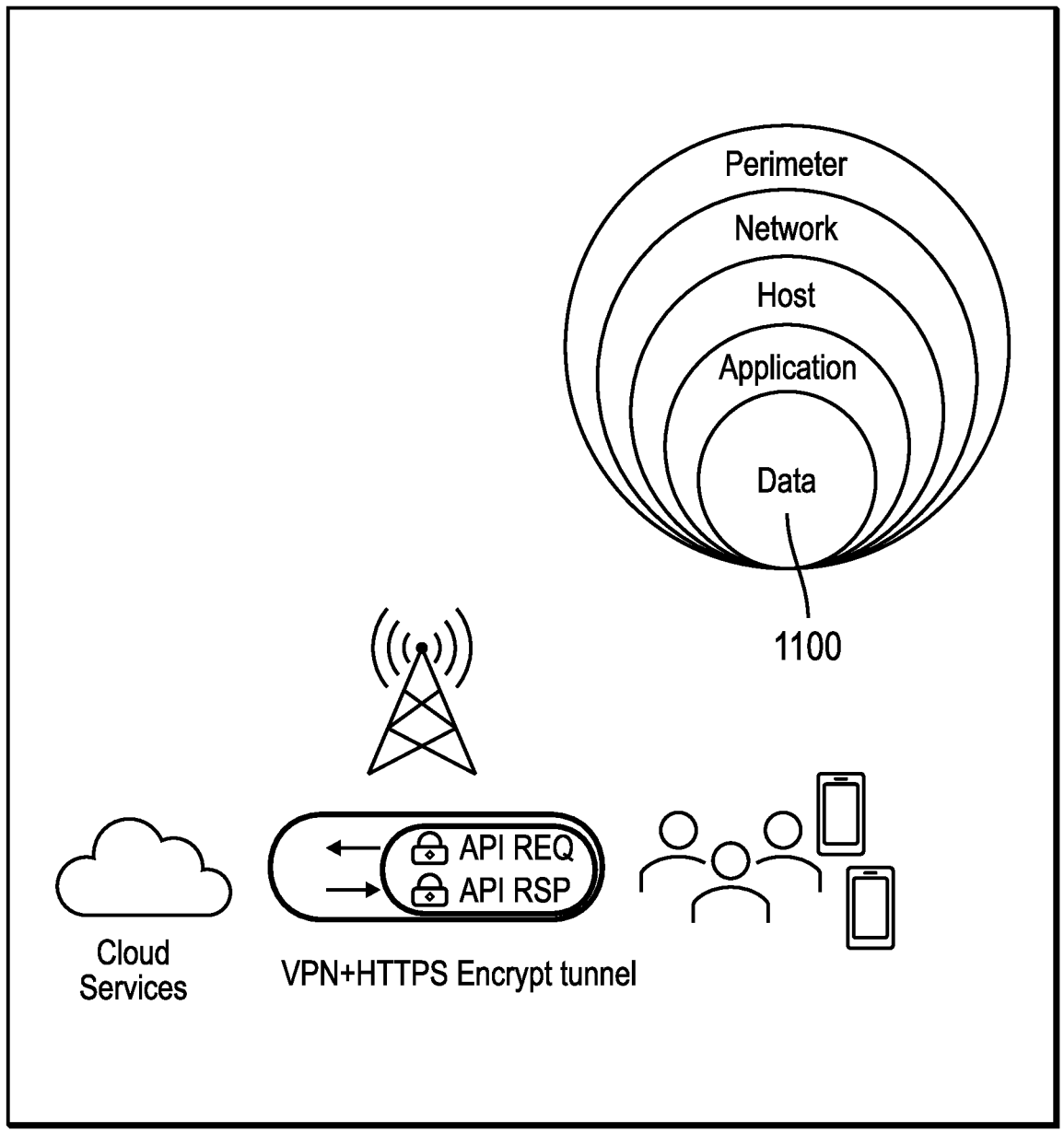
FIG. 11 illustrates an example multiple defense model (Defense in Depth) in accordance with certain embodiments.

FIG. 11 illustrates an example multiple defense model (Defense in Depth) in accordance with certain embodiments. In particular, layer 1100 cannot be breached remotely. Therefore, even if other layers are breached, layer 1100 cannot be remotely attacked. With embodiments, even if the pre-shared data (CB location information, APPID) is compromised and there is a visit to the location authority (LA)110, which means the level 1100 of security is broken, the other layers of protection are still in effect. For example, for an Application Programming Interface (API) using a Virtual Private Network (VPN)+Hypertext Transfer Protocol Secure (HTTPS) (server certificate authentication+client certificate authentication) for identity based encryption using the location authority-based key exchange, API communication requests and responses may be exchanged with encrypted text using public key cryptography.

Embodiments enable regionally closed message exchange, where the message sender encrypts the message (m) with the public key corresponding to the latitude and longitude to generate a cryptographic message (c), and then the message receiver uses proximity communication to communicate with the location authority (LA)110 that has jurisdiction over that latitude and longitude to obtain the private key and decrypt the cryptographic message (c) to output the message (m). In other words, embodiments provide a key sharing technique for multiple users to secure location-based communication.

Although visiting the command base location (CB) using an edge device in which location data cannot be or is hardly camouflaged is assumed in User Interface (UI)/User Experience (UX) at the time of installation, physically visiting CB may be avoided by using a virtual command base location (CB).

In certain embodiments, a virtual command base location (CB) may be used. For example, the command base location (CB) may be selected as a point on a map application provided by the C&C hardware security modules. A location set as a point in the map application is confirmed to be reachable and not in an off-limit area, etc. Also, it is possible that several command bases (CBs) are selected. For example, when there are four command base location (CB) points, secret data to reproduce a key includes the order of the four points. Whether keys created in the virtual command base location (CB) and the actual command base location (CB) are compatible or noncompatible may be selected in each installation.

In addition, a phrase describing a command base may be used to uniquely determine latitude/longitude by the C&C hardware security modules.

$CB = f(\text{phrase})$

For example, for f ("the bench next to the stand located in the square of xx park"), "the bench next to the stand located in the square of xx park") is converted into latitude/longitude by the function f within the C&C hardware security modules.

Figure 12:
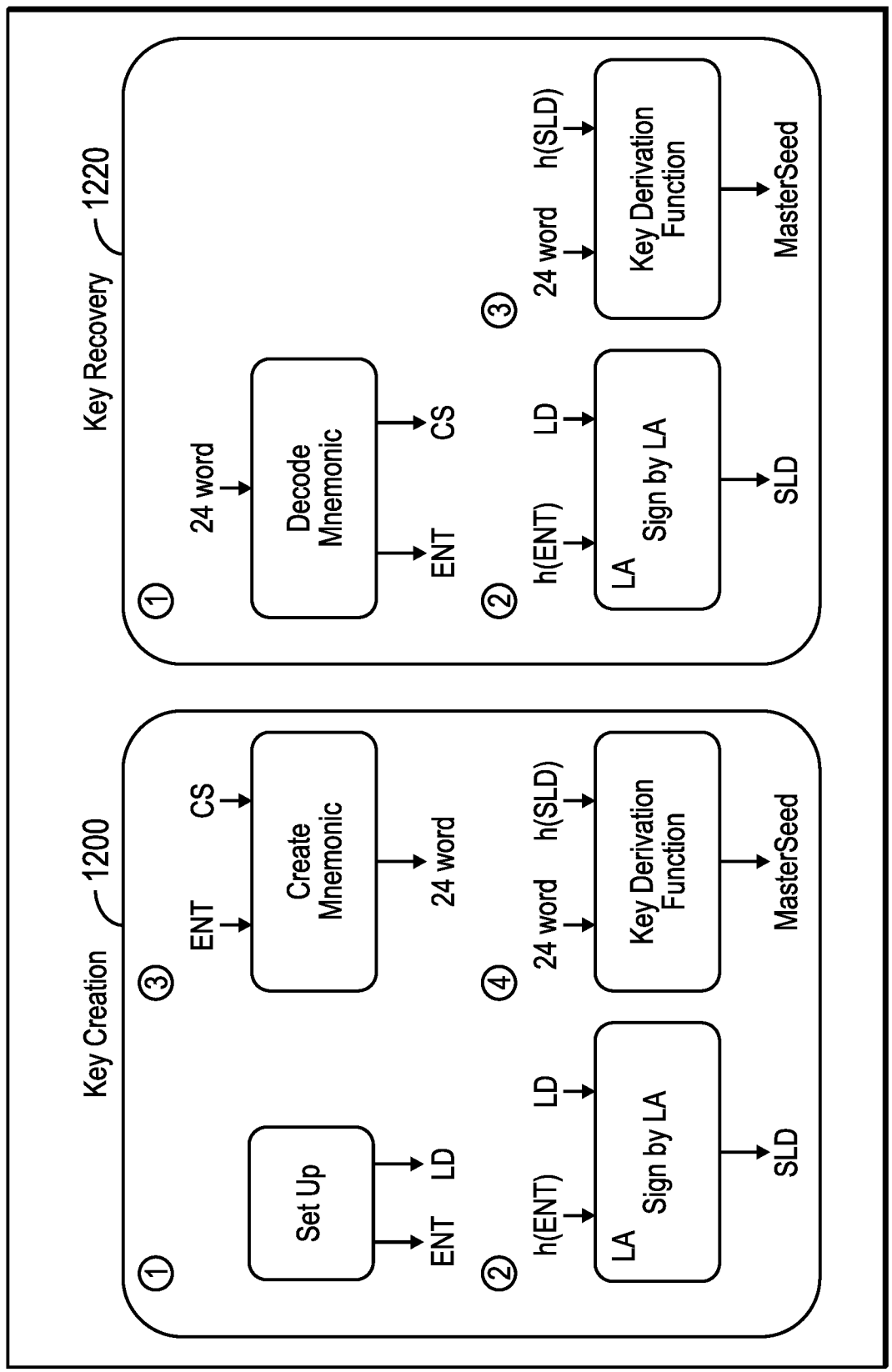
FIG. 12 illustrates logic flow for a wallet device in accordance with certain embodiments.

FIG. 12 illustrates logic flow for a wallet device in accordance with certain embodiments. This includes key creation 1200 and key recovery 1220. In this example, for key creation 1200, an entropy value (ENT) (e.g., a random number) and location data (LD) (e.g., a command base location (CB)) are generated. In certain embodiments, instead of the entropy value, the application ID (APPID) is used. The location authority (LA)110 receives a hash of the entropy value (ENT) (h(ENT)) and the location data (LD) and outputs a signed LD (SLD). The C&C hardware security modules use the entropy value (ENT) and the checksum (CS) to create a mnemonic of 24 words. The C&C hardware security modules use the 24 word mnemonic and the hash of the SLD (h(SLD)) to generate a master seed.

For key recovery 1220, the C&C hardware security modules decode the 24 word mnemonic to generate the entropy value ENT and the checksum (CS). The location authority (LA)110 receives the hash of ENT (h(ENT)) and the location data (LD) and outputs the signed location data (SLD). The C&C hardware security modules use a key derivation function and the 24 word mnemonic and the hash of the SLD (h(SLD)) to output the master seed.

FIG. 13 illustrates, in a flowchart, operations by a maker in accordance with certain embodiments. Control begins at block 1300 with a C&C hardware security module of a maker edge device determining a command base location (CB), an application ID (APPID), and an expire date for the application ID (APPID). In block 1302, the C&C hardware security module of the maker edge device sends the command base location (CB) and the application ID (APPID) to a taker edge device. In certain embodiments, the C&C hardware security module of the maker edge device shares (i.e., provides notification of) the command base location (CB) and the application ID (APPID) by e-mail, telephone, directly by peer to peer communication(1302), or in another manner.

In block 1304, the C&C hardware security module of the maker edge device sends a message generated from the command base location (CB) and a hash of the application ID (APPID) to a location authority. With embodiments, the expire date is also sent to the location authority, and the location authority stores the hash of the application ID (APPID) and the expire date in a table. In block 1306, the C&C hardware security module of the maker edge device receives a signed command base location (SCB) from the location authority because the command base location (CB) is within the jurisdiction and the expire date has not been reached. The location authority (LA) 110 is able to check the command base location (CB) to determine that it is in the jurisdiction and check the expire date in the table to determine that the application ID (APPID) is valid. In block 1308, the C&C hardware security module of the maker edge device uses the application ID (APPID) and a hash of the signed command base location (SCB) to generate a common key. In block 1310, the C&C hardware security module of the maker edge device uses the common key for cryptographic message exchange. For example, the common key may be used to encrypt a message to be sent to a C&C hardware security module of the taker edge device or may be used to decrypt a message received from the C&C hardware security module of the taker edge device.

Figure 14:
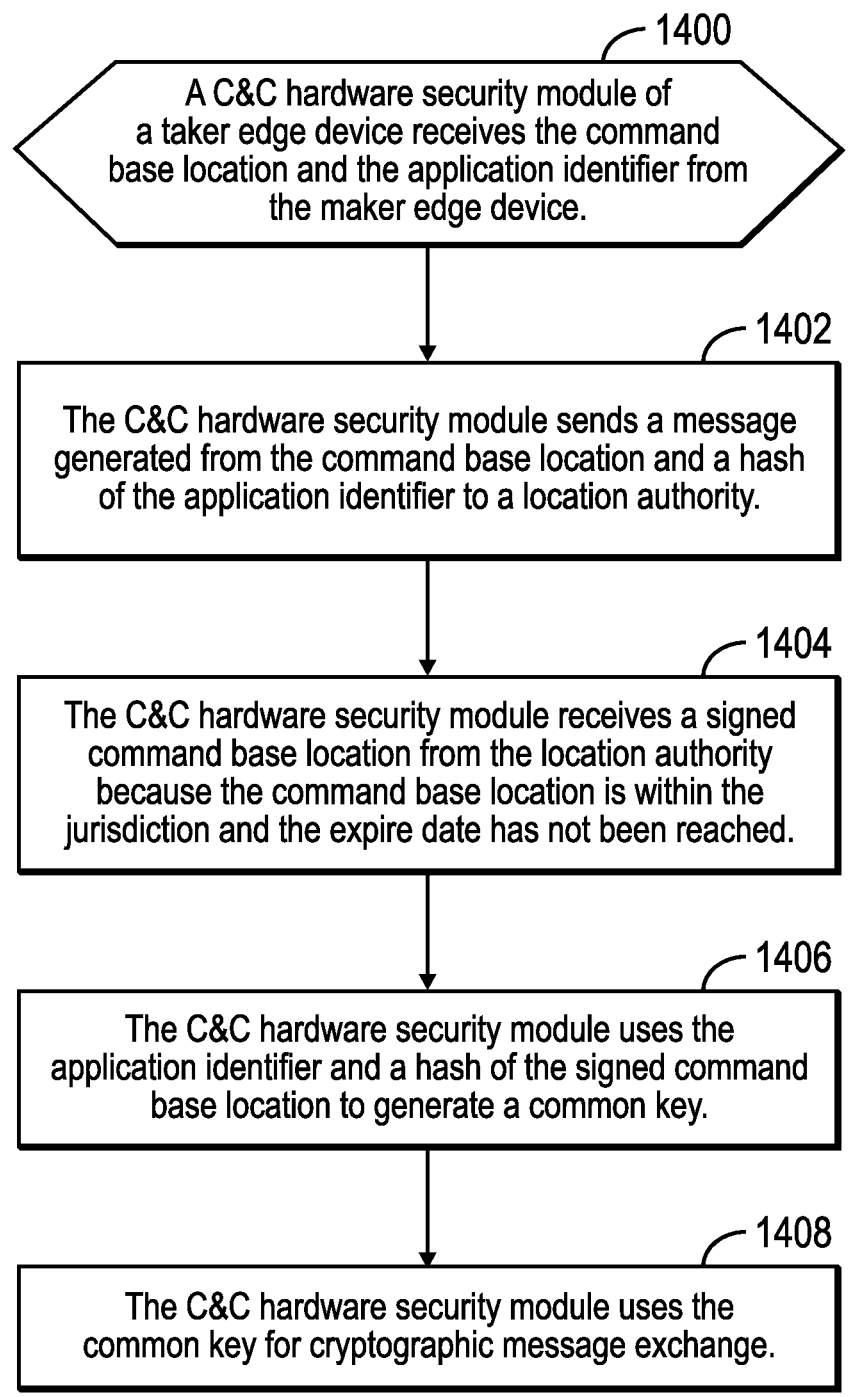
FIG. 14 illustrates, in a flowchart, operations by a taker in accordance with certain embodiments.

FIG. 14 illustrates, in a flowchart, operations by a taker in accordance with certain embodiments. Control begins at block 1400 with a C&C hardware security module of a taker edge device receiving the command base location (CB) and the application ID (APPID) from the maker edge device. In certain embodiments, the C&C hardware security module of the taker edge device receives the command base location (CB) and the application ID (APPID) by e-mail, telephone, directly by peer to peer communication(1302), or in another manner.

In block 1402, the C&C hardware security module of the taker edge device sends a message generated from the command base location (CB) and a hash of the application ID (APPID) to a location authority. In block 1404, the C&C hardware security module of the taker edge device receives a signed command base location (SCB) from the location authority because the command base location (CB) is within the jurisdiction and the expire date has not been reached. The location authority (LA) 110 is able to check the command base location (CB) to determine that it is in the jurisdiction and check the expire date in the table to determine that the application ID (APPID) is valid. In block 1406, the C&C hardware security module of the taker edge device uses the application ID (APPID) and a hash of the signed command base location (SCB) to generate a common key. In block 1408, the C&C hardware security module of the taker edge device uses the common key for cryptographic message exchange. For example, the common key may be used to encrypt a message to be sent to a C&C hardware security module of the maker edge device or may be used to decrypt a message received from the C&C hardware security module of the maker edge device.

Figure 15:
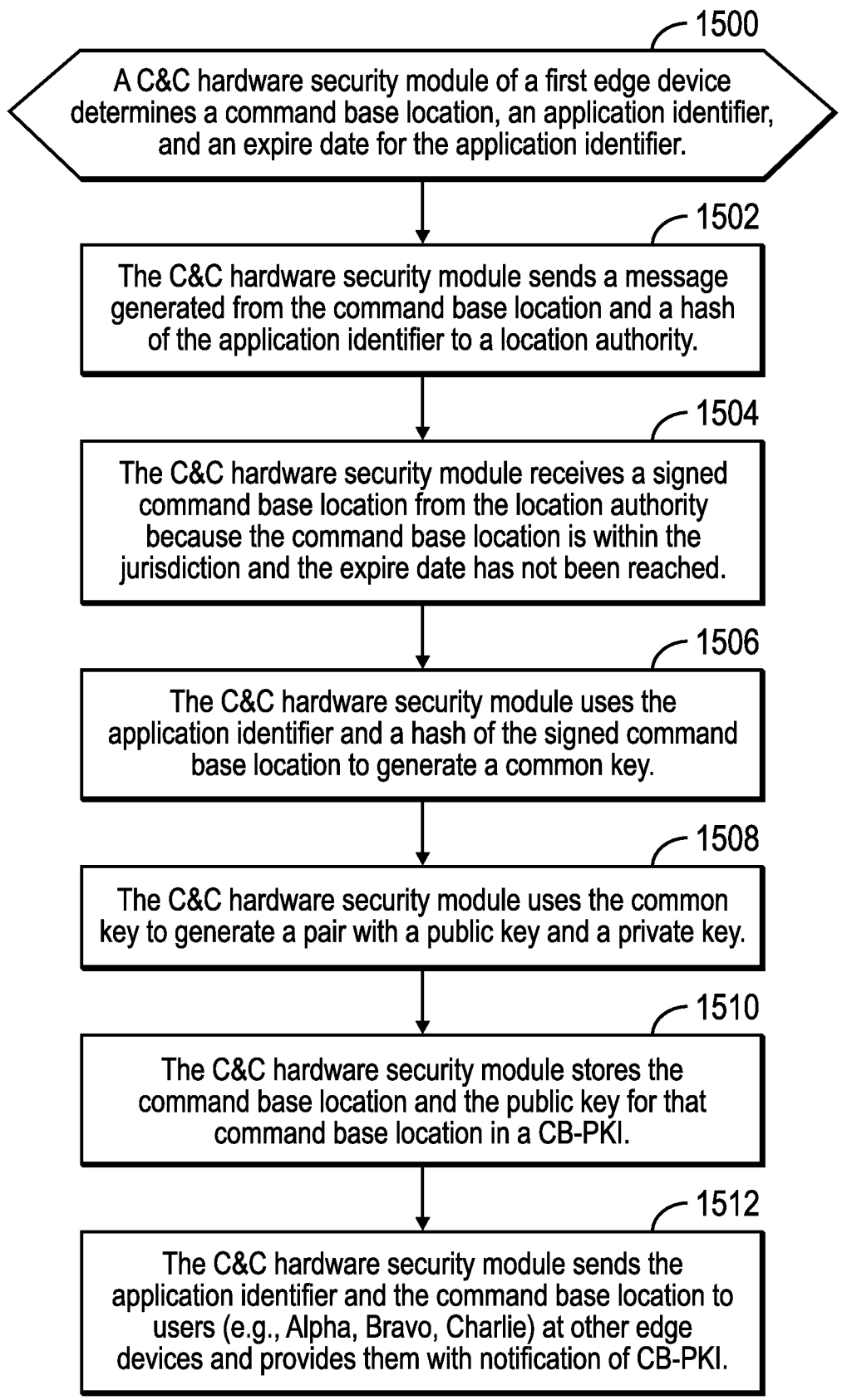
FIG. 15 illustrates, in a flowchart, operations by a first edge device using PKI and a location authority based key exchange in accordance with certain embodiments.

FIG. 15 illustrates, in a flowchart, operations by a first edge device using PKI and a location authority based key exchange in accordance with certain embodiments. Control begins at block 1500 with a C&C hardware security module of a first edge device determining a command base location (CB), an application ID (APPID), and an expire date for the application ID (APPID). In block 1502, the C&C hardware security module of the first edge device sends a message (m) generated from the command base location (CB) and a hash of the application ID (APPID) to a location authority. With embodiments, the expire date is also sent to the location authority, and the location authority stores the hash of the application ID (APPID) and the expire date in a table. In block 1504, the C&C hardware security module of the first edge device receives a signed command base location (SCB) from the location authority because the command base location (CB) is within the jurisdiction and the expire date has not been reached. The location authority (LA)110 is able to check the command base location (CB) to determine that it is in the jurisdiction and check the expire date in the table to determine that the application ID (APPID) is valid. In block 1506, the C&C hardware security module of the first edge device uses the application ID (APPID) and a hash of the signed command base location (SCB) to generate a common key. In block 1508, the C&C hardware security module of the first edge device uses the common key to generate a pair with a public key and a private key. In block 1510, the C&C hardware security module of the first edge device stores the command base location (CB) and the public key for that command base location (CB) in a CB-PKI. In block 1512, the C&C hardware security module of the first edge device sends the application ID (APPID) and the command base location (CB) to users (e.g., Alpha, Bravo, Charlie) at other edge devices and provides them with notification of CB-PKI.

Figure 16:
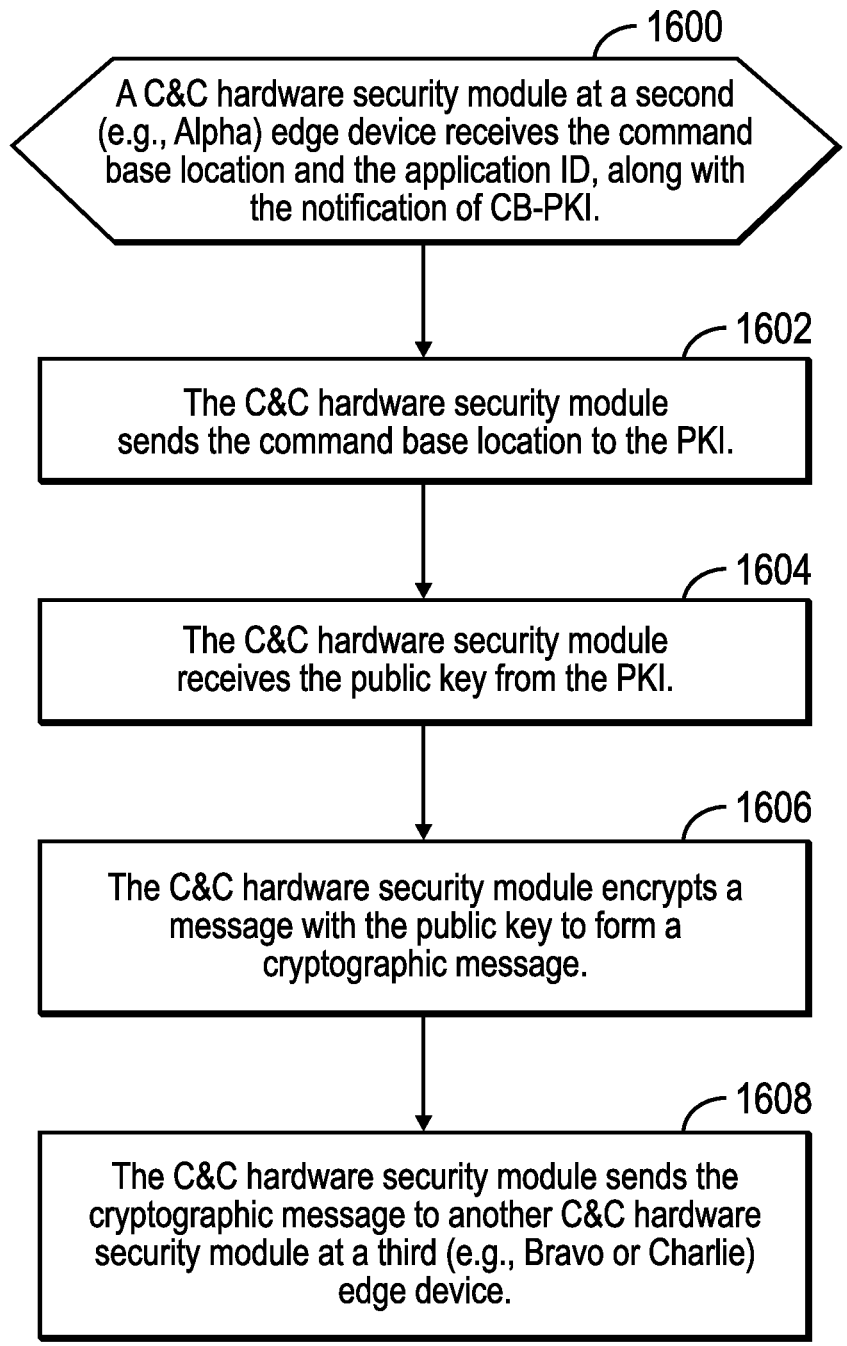
FIG. 16 illustrates, in a flowchart, operations by a second edge device using PKI and a location authority based key exchange in accordance with certain embodiments.

FIG. 16 illustrates, in a flowchart, operations by a second edge device using PKI and a location authority based key exchange in accordance with certain embodiments. Control begins at block 1600 with a C&C hardware security module at a second (e.g., Alpha) edge device receiving the command base location and the application ID (APPID), along with the notification of CB-PKI. In block 1602, the a C&C hardware security module at the second (e.g., Alpha) edge device sends the command base location to the PKI. In block 1604, the a C&C hardware security module at the second (e.g., Alpha) edge device receives the public key from the PKI. In block 1606, the a C&C hardware security module at the second (e.g., Alpha) edge device encrypts a message (m) with the public key to form a cryptographic message (c). In block 1608, the a C&C hardware security module at the second (e.g., Alpha) edge device sends the cryptographic message (c) to another C&C hardware security module at a third (e.g., Bravo or Charlie) edge device.

Figure 17:
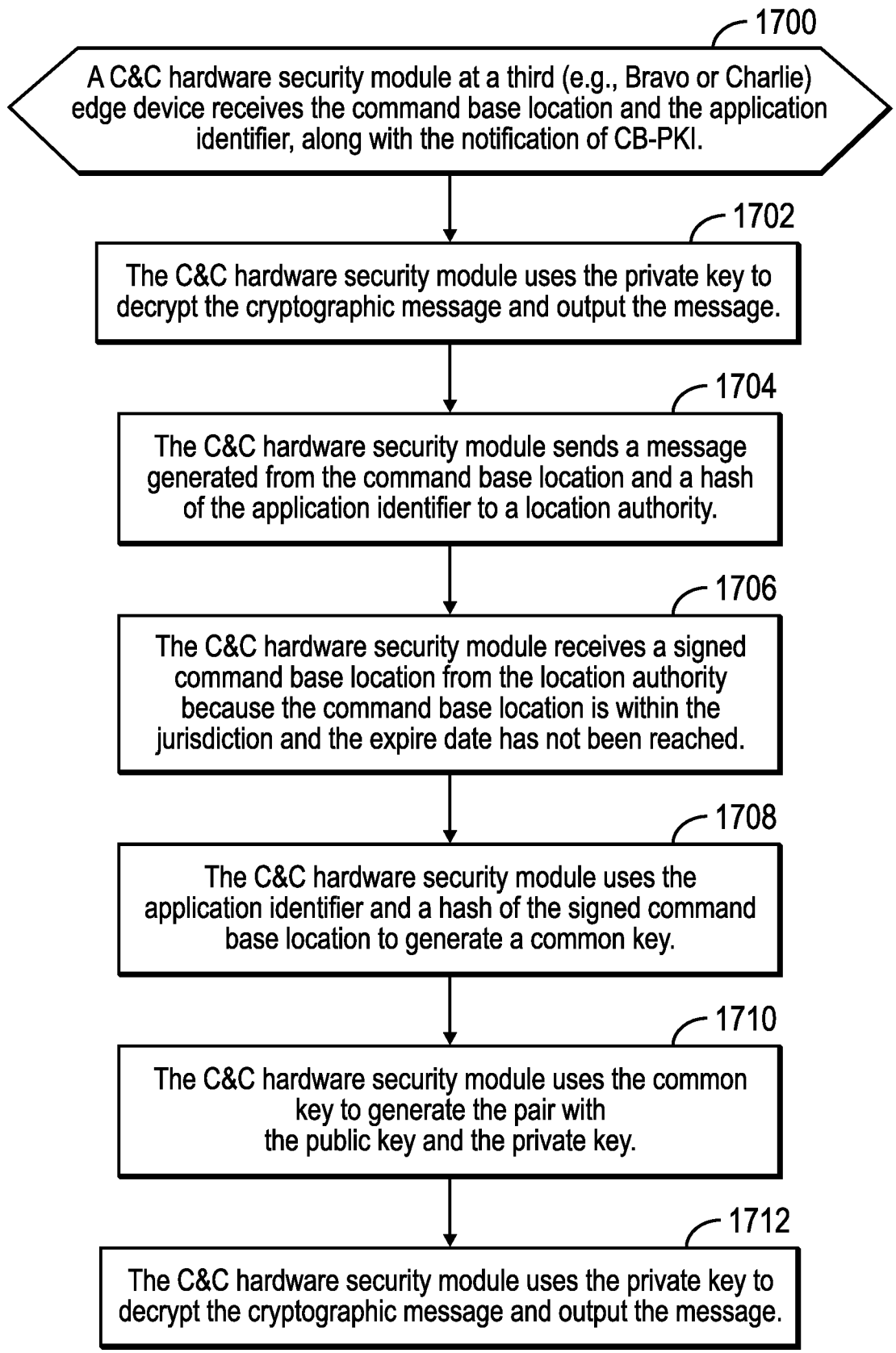
FIG. 17 illustrates, in a flowchart, operations by a third edge using PKI and a location authority based key exchange in accordance with certain embodiments.

FIG. 17 illustrates, in a flowchart, operations by a third edge device using PKI and a location authority based key exchange in accordance with certain embodiments. Control begins at block 1700 with a C&C hardware security module at a third (e.g., Bravo or Charlie) edge device receiving the command base location and the application, along with the notification of CB-PKI. In block 1702, the C&C hardware security module at the third (e.g., Bravo or Charlie) edge device receives the cryptographic message (c). In block 1704, the a C&C hardware security module at the third (e.g., Bravo or Charlie) edge device sends a message (m) generated from the command base location (CB) and a hash of the application ID (APPID) to a location authority. In block 1706, the C&C hardware security module at the third (e.g., Bravo or Charlie) edge device receives a signed command base location (SCB) from the location authority because the command base location is within the jurisdiction and the expire date has not been reached. The location authority (LA)110 is able to check the command base location (CB) to determine that it is in the jurisdiction and check the expire date in the table to determine that the application ID (APPID) is valid. In block 1708, the C&C hardware security module at the third (e.g., Bravo or Charlie) edge device uses the application ID (APPID) and a hash of the signed command base location (SCB) to generate a common key. In block 1710, the C&C hardware security module at the third (e.g., Bravo or Charlie) edge device uses the common key to generate the pair with the public key and the private key. In block 1712, the C&C hardware security module at the third (e.g., Bravo or Charlie) edge device uses the private key to decrypt the cryptographic message (c) and output the message (m).

Figure 18:
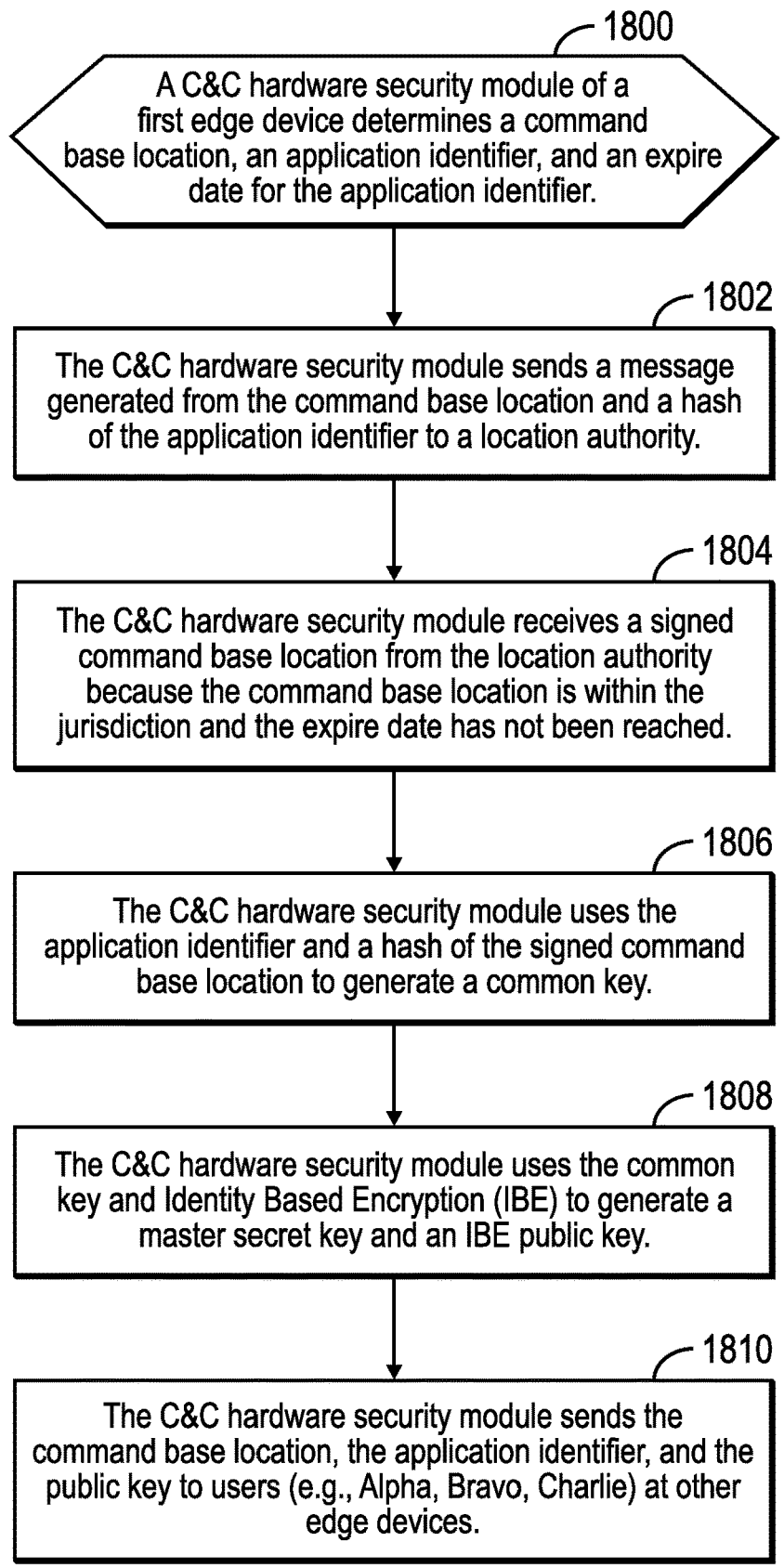
FIG. 18 illustrates, in a flowchart, operations by a first edge device for identity based encryption using a location authority based key exchange in accordance with certain embodiments.

FIG. 18 illustrates, in a flowchart, operations by a first edge device for identity based encryption using a location authority based key exchange in accordance with certain embodiments.

Control begins at block 1800 with a C&C hardware security module of a first edge device determining a command base location (CB), an application ID (APPID), and an expire date for the application ID (APPID). In block 1802, the C&C hardware security module of the first edge device sends a message (m) generated from the command base location (CB) and a hash of the application ID (APPID) to a location authority. With embodiments, the expire date is also sent to the location authority, and the location authority stores the hash of the application ID (APPID) and the expire date in a table. In block 1804, the C&C hardware security module of the first edge device receives a signed command base location (SCB) from the location authority because the command base location is within the jurisdiction and the expire date has not been reached. The location authority (LA) 110 is able to check the command base location (CB) to determine that it is in the jurisdiction and check the expire date in the table to determine that the application ID (APPID) is valid. In block 1806, the C&C hardware security module of the first edge device uses the application ID (APPID) and a hash of the signed command base location (SCB) to generate a common key. In block 1808, the C&C hardware security module of the first edge device uses the common key and Identity Based Encryption (IBE) to generate a master secret key and an IBE public key. In block 1810, the C&C hardware security module of the first edge device sends the command base location (CB), the application ID (APPID), and the public key to users (e.g., Alpha, Bravo, Charlie) at other edge devices.

Figure 19:
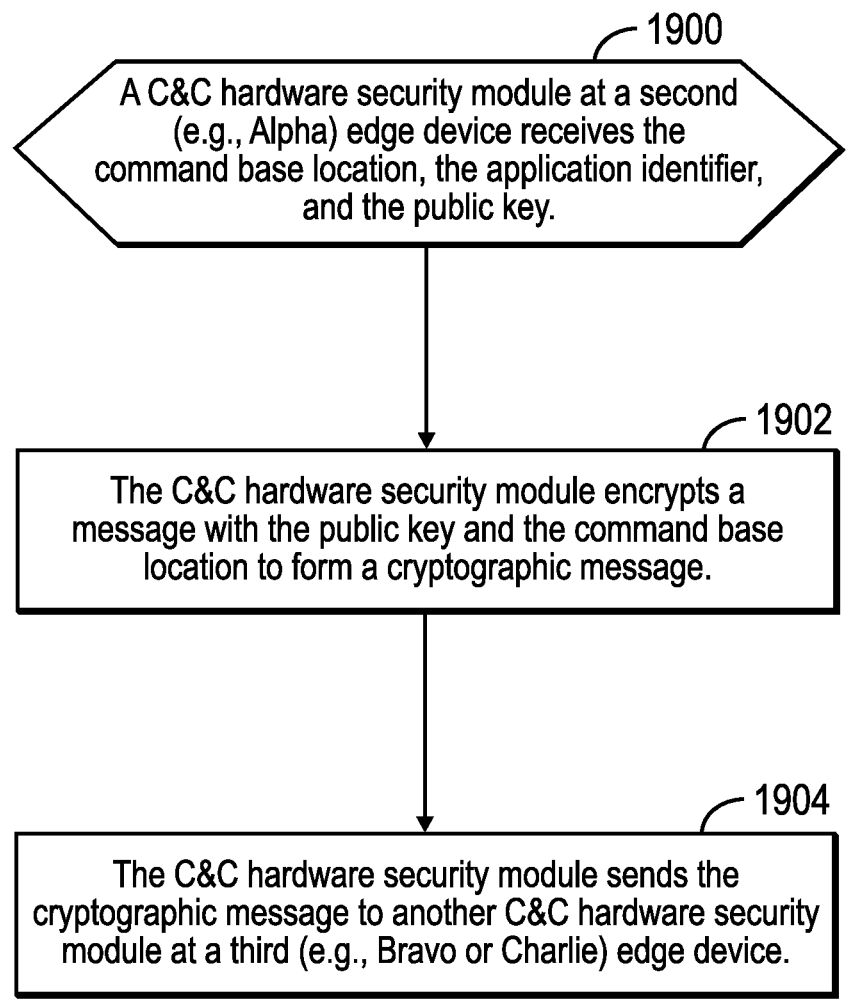
FIG. 19 illustrates, in a flowchart, operations by a second edge device for identity based encryption using a location authority based key exchange in accordance with certain embodiments.

FIG. 19 illustrates, in a flowchart, operations by a second edge device for identity based encryption using a location authority based key exchange in accordance with certain embodiments. Control begins at block 1900 with a C&C hardware security module at a second (e.g., Alpha) edge device receiving the command base location, the application ID (APPID), and the public key. In block 1902, the C&C hardware security module at the second (e.g., Alpha) edge device encrypts a message (m) with the public key and the command base location (CB) to form a cryptographic message (c). In block 1904, the C&C hardware security module at the second (e.g., Alpha) edge device sends the cryptographic message (c) to another C&C hardware security module at a third (e.g., Bravo or Charlie) edge device.

Figure 20:
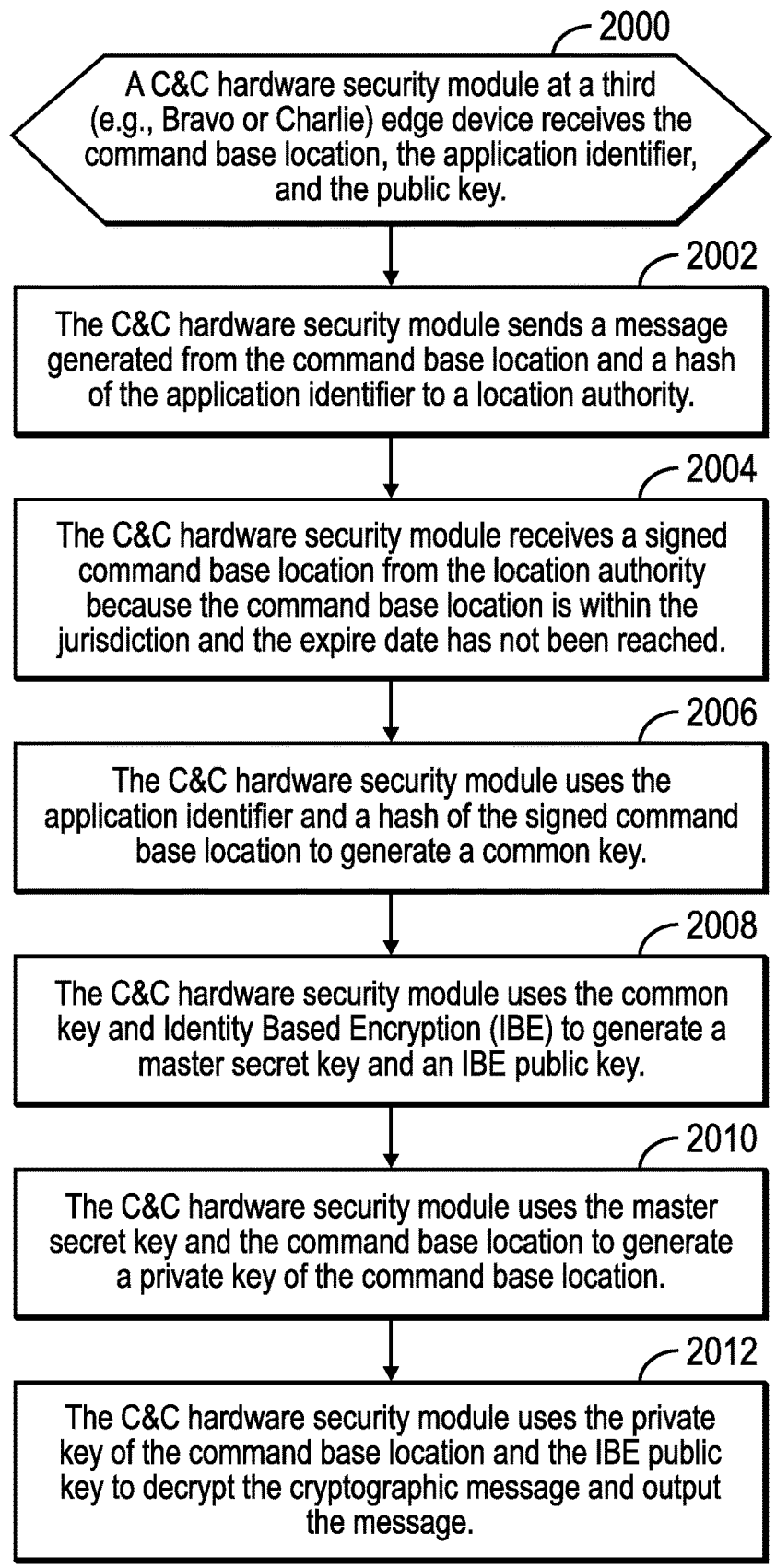
FIG. 20 illustrates, in a flowchart, operations by a third edge device for identity based encryption using a location authority based key exchange in accordance with certain embodiments.

FIG. 20 illustrates, in a flowchart, operations by a third edge device for identity based encryption using a location authority based key exchange in accordance with certain embodiments. Control begins at block 2000 with a C&C hardware security module at a third (e.g., Bravo or Charlie) edge device receiving the command base location, the application ID (APPID), and the public key. In block 2002, the C&C hardware security module at the third (e.g., Bravo or Charlie) edge device sends a message (m) generated from the command base location (CB) and a hash of the application ID (APPID) to a location authority. In block 2004, the C&C hardware security module at the third (e.g., Bravo or Charlie) edge device receives a signed command base location (SCB) from the location authority because the command base location (CB) is within the jurisdiction and the expire date has not been reached. The location authority (LA)110 is able to check the command base location (CB) to determine that it is in the jurisdiction and check the expire date in the table to determine that the application ID (APPID) is valid. In block 2006, the C&C hardware security module at the third (e.g., Bravo or Charlie) edge device uses the application ID (APPID) and a hash of the signed command base location (SCB) to generate a common key. In block 2008, the C&C hardware security module at the third (e.g., Bravo or Charlie) edge device uses the common key and Identity Based Encryption (IBE) to generate a master secret key (msk) and an IBE public key (pk). In block 2010, the C&C hardware security module at the third (e.g., Bravo or Charlie) edge device uses the master secret key (msk) and the command base location (CB) to generate a private key of the command base location (dCB). In block 2012, the C&C hardware security module at the third (e.g., Bravo or Charlie) edge device uses the private key of the command base location (dCB) and the IBE public key (pk) to decrypt the cryptographic message (c) and output the message (m).

Figure 21:
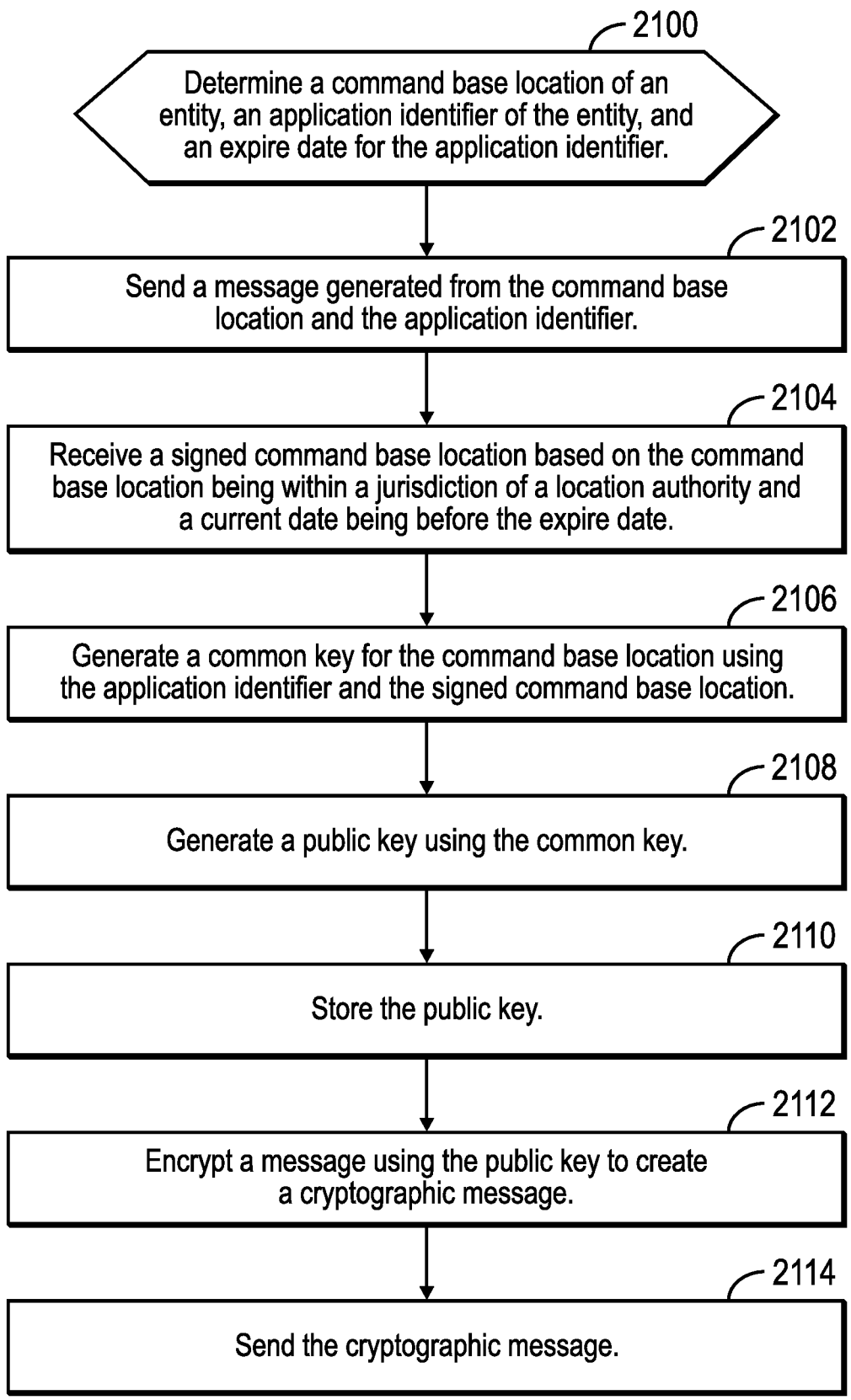
FIG. 21 illustrates, in a flowchart, operations for providing security for edge computing using location data in accordance with certain embodiments.

FIG. 21 illustrates, in a flowchart, operations for providing security for edge computing using location data in accordance with certain embodiments. Control begins at block 2100 with a C&C hardware security module at an edge device determining a command base location of an entity, an application ID (APPID) of the entity, and an expire date for the application ID (APPID). In block 2102, the C&C hardware security module at the edge device sends a message (m) generated from the command base location and the application ID (APPID) (which may be a hash of the application ID (APPID)). In block 2104, the C&C hardware security module at the edge device receives a signed command base location (SCB) based on the command base location (CB) being within a jurisdiction of a location authority and a current date being before the expire date. In block 2106, the C&C hardware security module at the edge device generates a common key for the command base location (CB) using the application ID (APPID) and the signed command base location (SCB). In block 2108, the C&C hardware security module at the edge device generates a public key using the common key. In block 2110, the C&C hardware security module at the edge device stores the public key. In block 2112, the C&C hardware security module at the edge device encrypts a message (m) using the public key to create a cryptographic message (c). In block 2114, the C&C hardware security module at the edge device sends the cryptographic message (c).

Often, with edge computing, the edge devices are controlled from the cloud (e.g., via a 5G network, etc.). Embodiments provide security measures in edge devices and Internet of Things (IoT) devices. For example, embodiments provide security measures for plant control systems and to prevent supply chain attacks.

Certain embodiments provide an access key, such as a sign-in message, safely to a plurality of entities (i.e., subjects, including both participants and edge devices) using location data (e.g., the location of a command base). An application ID (APPID) is assigned for each of the entities. A pair of a public key and a private key are generated based on a common key. A cryptographic key of a sign-in message is created using the location data and the public key. The application ID (APPID) and the cryptographic key are transmitted to each of the entities. The location data of the location is acquired by each of the entities at the location. The sign-in message is derived from the application ID (APPID), the cryptographic key, and the acquired location data by each of the entities at the location authority (LA)110.

In certain embodiments, an administrative unit defines the location as a command base location (CB) and defines the sign-in message. The location data of the command base location (CB) and the public key are acquired by the administrative unit. The cryptographic key of the sign-in message is created using the location data of the command base location (CB) and the public key to transmit the cryptographic key to each of the entities, by the administrative unit.

In certain embodiments, the public key associated with the location data is stored in PKI. The public key is retrieved from the location data through PKI, by the administrative unit.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 22:
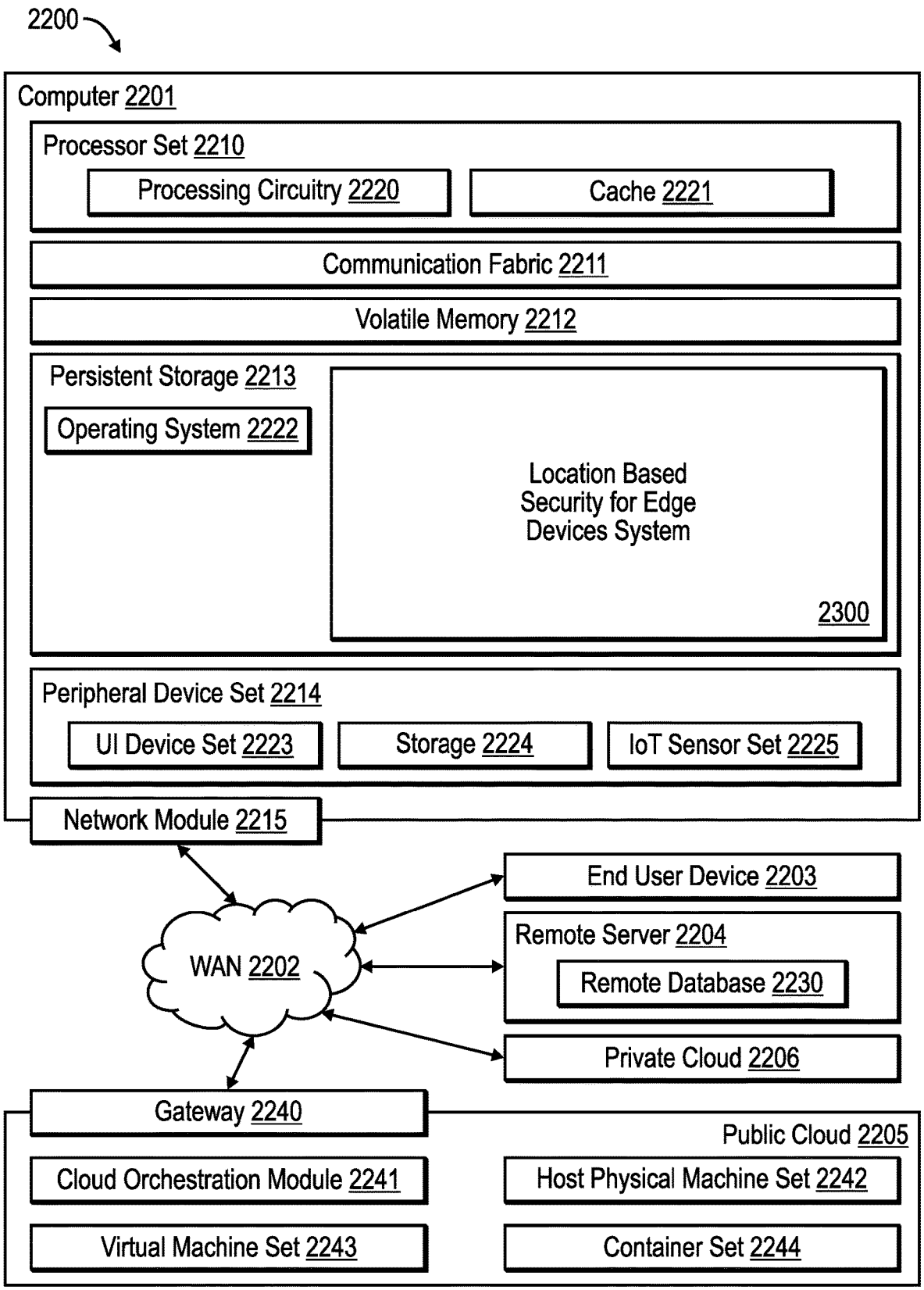
FIG. 22 illustrates a computing environment in accordance with certain embodiments.

FIG. 22 illustrates a computing environment 2200 in accordance with certain embodiments. Computing environment 2200 contains an example of an environment for the execution of at least some of the computer code involved in performing the inventive methods, such as operations for location based security for edge devices system operations 2300 (such as system 132, 162, 712, 732, 752 and/or 772). In certain embodiments, block 230 has the code for the C&C hardware security module.

In addition to block 2300, computing environment 2200 includes, for example, computer 2201 (which may be an edge device 130, 160, 710, 730, 750, 770), wide area network (WAN) 2202, end user device (EUD) 2203, remote server 2204, public cloud 2205, and private cloud 2206. In this embodiment, computer 2201 includes processor set 2210 (including processing circuitry 2220 and cache 2221), communication fabric 2211, volatile memory 2212, persistent storage 2213 (including operating system 2222 and block 2300, as identified above), peripheral device set 2214 (including user interface (UI) device set 2223, storage 2224, and Internet of Things (IoT) sensor set 2225), and network module 2215. Remote server 2204 includes remote database 2230. Public cloud 2205 includes gateway 2240, cloud orchestration module 2241, host physical machine set 2242, virtual machine set 2243, and container set 2244.

COMPUTER 2201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 2230. As is well understood in the art of computer technology, and depending upon the technology, performance of a computer-implemented method may be distributed among multiple computers and/or between multiple locations. On the other hand, in this presentation of computing environment 2200, detailed discussion is focused on a single computer, specifically computer 2201, to keep the presentation as simple as possible. Computer 2201 may be located in a cloud, even though it is not shown in a cloud in FIG. 22. On the other hand, computer 2201 is not required to be in a cloud except to any extent as may be affirmatively indicated.

PROCESSOR SET 2210 includes one, or more, computer processors of any type now known or to be developed in the future. Processing circuitry 2220 may be distributed over multiple packages, for example, multiple, coordinated integrated circuit chips. Processing circuitry 2220 may implement multiple processor threads and/or multiple processor cores. Cache 2221 is memory that is located in the processor chip package(s) and is typically used for data or code that should be available for rapid access by the threads or cores running on processor set 2210. Cache memories are typically organized into multiple levels depending upon relative proximity to the processing circuitry. Alternatively, some, or all, of the cache for the processor set may be located "off chip." In some computing environments, processor set 2210 may be designed for working with qubits and performing quantum computing.

Computer readable program instructions are typically loaded onto computer 2201 to cause a series of operational steps to be performed by processor set 2210 of computer 2201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 2221 and the other storage media discussed below. The program instructions, and associated data, are accessed by processor set 2210 to control and direct performance of the inventive methods. In computing environment 2200, at least some of the instructions for performing the inventive methods may be stored in block 2300 in persistent storage 2213.

COMMUNICATION FABRIC 2211 is the signal conduction path that allows the various components of computer 2201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 2212 is any type of volatile memory now known or to be developed in the future. Examples include dynamic type random access memory (RAM) or static type RAM. Typically, volatile memory 2212 is characterized by random access, but this is not required unless affirmatively indicated. In computer 2201, the volatile memory 2212 is located in a single package and is internal to computer 2201, but, alternatively or additionally, the volatile memory may be distributed over multiple packages and/or located externally with respect to computer 2201.

PERSISTENT STORAGE 2213 is any form of non-volatile storage for computers that is now known or to be developed in the future. The non-volatility of this storage means that the stored data is maintained regardless of whether power is being supplied to computer 2201 and/or directly to persistent storage 2213. Persistent storage 2213 may be a read only memory (ROM), but typically at least a portion of the persistent storage allows writing of data, deletion of data and re-writing of data. Some familiar forms of persistent storage include magnetic disks and solid state storage devices. Operating system 2222 may take several forms, such as various known proprietary operating systems or open source Portable Operating System Interface-type operating systems that employ a kernel. The code included in block 2300 typically includes at least some of the computer code involved in performing the inventive methods.

PERIPHERAL DEVICE SET 2214 includes the set of peripheral devices of computer 2201. Data communication connections between the peripheral devices and the other components of computer 2201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 2223 may include components such as a display screen, speaker, microphone, wearable devices (such as goggles and smart watches), keyboard, mouse, printer, touchpad, game controllers, and haptic devices. Storage 2224 is external storage, such as an external hard drive, or insertable storage, such as an SD card. Storage 2224 may be persistent and/or volatile. In some embodiments, storage 2224 may take the form of a quantum computing storage device for storing data in the form of qubits. In embodiments where computer 2201 is required to have a large amount of storage (for example, where computer 2201 locally stores and manages a large database) then this storage may be provided by peripheral storage devices designed for storing very large amounts of data, such as a storage area network (SAN) that is shared by multiple, geographically distributed computers. IoT sensor set 2225 is made up of sensors that can be used in Internet of Things applications. For example, one sensor may be a thermometer and another sensor may be a motion detector.

NETWORK MODULE 2215 is the collection of computer software, hardware, and firmware that allows computer 2201 to communicate with other computers through WAN 2202. Network module 2215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 2215 are performed on the same physical hardware device. In other embodiments (for example, embodiments that utilize software-defined networking (SDN)), the control functions and the forwarding functions of network module 2215 are performed on physically separate devices, such that the control functions manage several different network hardware devices. Computer readable program instructions for performing the inventive methods can typically be downloaded to computer 2201 from an external computer or external storage device through a network adapter card or network interface included in network module 2215.

WAN 2202 is any wide area network (for example, the internet) capable of communicating computer data over non-local distances by any technology for communicating computer data, now known or to be developed in the future. In some embodiments, the WAN 2202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 2203 is any computer system that is used and controlled by an end user (for example, a customer of an enterprise that operates computer 2201), and may take any of the forms discussed above in connection with computer 2201. EUD 2203 typically receives helpful and useful data from the operations of computer 2201. For example, in a hypothetical case where computer 2201 is designed to provide a recommendation to an end user, this recommendation would typically be communicated from network module 2215 of computer 2201 through WAN 2202 to EUD 2203. In this way, EUD 2203 can display, or otherwise present, the recommendation to an end user. In some embodiments, EUD 2203 may be a client device, such as thin client, heavy client, mainframe computer, desktop computer and so on.

REMOTE SERVER 2204 is any computer system that serves at least some data and/or functionality to computer 2201. Remote server 2204 may be controlled and used by the same entity that operates computer 2201. Remote server 2204 represents the machine(s) that collect and store helpful and useful data for use by other computers, such as computer 2201. For example, in a hypothetical case where computer 2201 is designed and programmed to provide a recommendation based on historical data, then this historical data may be provided to computer 2201 from remote database 2230 of remote server 2204.

PUBLIC CLOUD 2205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 2205 is performed by the computer hardware and/or software of cloud orchestration module 2241. The computing resources provided by public cloud 2205 are typically implemented by virtual computing environments that run on various computers making up the computers of host physical machine set 2242, which is the universe of physical computers in and/or available to public cloud 2205. The virtual computing environments (VCEs) typically take the form of virtual machines from virtual machine set 2243 and/or containers from container set 2244. It is understood that these VCEs may be stored as images and may be transferred among and between the various physical machine hosts, either as images or after instantiation of the VCE. Cloud orchestration module 2241 manages the transfer and storage of images, deploys new instantiations of VCEs and manages active instantiations of VCE deployments. Gateway 2240 is the collection of computer software, hardware, and firmware that allows public cloud 2205 to communicate through WAN 2202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 2206 is similar to public cloud 2205, except that the computing resources are only available for use by a single enterprise. While private cloud 2206 is depicted as being in communication with WAN 2202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 2205 and private cloud 2206 are both part of a larger hybrid cloud.

In certain embodiments, the authorization computer 100 has the components of computer 2201 with block 2300 including location authority operations instead of the operations for location based security for edge devices system operations.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer program product, the computer program product comprising a computer readable storage medium having program instructions embodied therewith, the program instructions executable by a processor to cause the processor to perform operations for:
   determining a command base location of an entity, an application identifier of the entity, and an expire date for the application identifier;
   sending a message generated from the command base location and the application identifier to a location authority;
   receiving a signed command base location based on the command base location being within a jurisdiction of the location authority and a current date being before the expire date;
   generating a common key for the command base location using the application identifier and the signed command base location;
   generating a public key using the common key;
   encrypting a message using the public key to create a cryptographic message; and
   sending the cryptographic message.

2. The computer program product of claim 1, wherein the command base location comprises a latitude and a longitude, wherein the entity comprises a first edge device, and wherein the cryptographic message is sent to a second edge device.

3. A computer program product of claim 1, wherein the program code is executable by at least one processor to perform further operations for:
   generating a command base location-public key infrastructure, wherein the public key is retrieved from the command base location-public key infrastructure using the command base location.

4. The computer program product of claim 1, wherein the program code is executable by at least one processor to perform further operations for:
    receiving the cryptographic message;
    generating the common key for the command base location;
    generating a pair with the public key and a private key using the common key; and
    decrypting the cryptographic message using the private key.

5. The computer program product of claim 1, wherein the program code is executable by at least one processor to perform further operations for:
    generating a master secret key and the public key using an identity based encryption technique, wherein the message is encrypted using the public key and the command base location.

6. The computer program product of claim 5, wherein the program code is executable by at least one processor to perform further operations for:
    receiving the cryptographic message;
    generating the common key for the command base location;
    generating the master secret key and the public key using the common key;
    retrieving a private key using the master secret key and the command base location; and
    decrypting the cryptographic message using the private key and the public key.

7. The computer program product of claim 1, wherein the entity comprises a first edge device, and wherein the common key is used to exchange messages with a second edge device.

8. A computer-implemented method, comprising operations for:
    determining a command base location of an entity, an application identifier of the entity, and an expire date for the application identifier;
    sending a message generated from the command base location and the application identifier to a location authority;
    receiving a signed command base location based on the command base location being within a jurisdiction of the location authority and a current date being before the expire date;
    generating a common key for the command base location using the application identifier and the signed command base location;
    generating a public key using the common key;
    encrypting a message using the public key to create a cryptographic message; and
    sending the cryptographic message.

9. The computer-implemented method of claim 8, wherein the command base location comprises a latitude and a longitude, wherein the entity comprises a first edge device, and wherein the cryptographic message is sent to a second edge device.

10. A computer-implemented method of claim 8, further comprising operations for:
    generating a command base location-public key infrastructure, wherein the public key is retrieved from the command base location-public key infrastructure using the command base location.

11. The computer-implemented method of claim 8, further comprising operations for:
    receiving the cryptographic message;
    generating the common key for the command base location;
    generating a pair with the public key and a private key using the common key; and
    decrypting the cryptographic message using the private key.

12. The computer-implemented method of claim 8, further comprising operations for:
    generating a master secret key and the public key using an identity based encryption technique, wherein the message is encrypted using the public key and the command base location.

13. The computer-implemented method of claim 8, further comprising operations for:
    receiving the cryptographic message;
    generating the common key for the command base location;
    generating the master secret key and the public key using the common key;
    retrieving a private key using the master secret key and the command base location; and
    decrypting the cryptographic message using the private key and the public key.

14. The computer-implemented method of claim 8, wherein the entity comprises a first edge device, and wherein the common key is used to exchange messages with a second edge device.

15. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    determining a command base location of an entity, an application identifier of the entity, and an expire date for the application identifier;
    sending a message generated from the command base location and the application identifier to a location authority;
    receiving a signed command base location based on the command base location being within a jurisdiction of the location authority and a current date being before the expire date;
    generating a common key for the command base location using the application identifier and the signed command base location;
    generating a public key using the common key;
    encrypting a message using the public key to create a cryptographic message; and
    sending the cryptographic message.

16. The computer system of claim 15, wherein the command base location comprises a latitude and a longitude, wherein the entity comprises a first edge device, and wherein the cryptographic message is sent to a second edge device.

17. The computer system of claim 15, wherein the operations further comprise:
    generating a command base location-public key infrastructure, wherein the public key is retrieved from the command base location-public key infrastructure using the command base location.

18. The computer system of claim 15, wherein the operations further comprise:
    receiving the cryptographic message;

generating the common key for the command base location;

generating a pair with the public key and a private key using the common key; and decrypting the cryptographic message using the private key.

19. The computer system of claim 15, wherein the operations further comprise:

generating a master secret key and the public key using an identity based encryption technique, wherein the message is encrypted using the public key and the command base location.

20. The computer system of claim 19, further comprising operations for:

receiving the cryptographic message;

generating the common key for the command base location;

generating the master secret key and the public key using the common key;

retrieving a private key using the master secret key and the command base location; and decrypting the cryptographic message using the private key and the public key.

\* \* \* \* \*